(12) United States Patent
Naito

(10) Patent No.: US 8,730,430 B2
(45) Date of Patent: May 20, 2014

(54) BACKLIGHT ASSEMBLY FOR SUPPLYING ELECTRIC POWER TO A LIGHT-EMITTING ELEMENT VIA A CONNECTOR AND A BACKLIGHT UNIT AND A LIQUID CRYSTAL DISPLAY WHICH USE THE BACKLIGHT ASSEMBLY

(75) Inventor: Takeharu Naito, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 510 days.

(21) Appl. No.: 13/065,391

(22) Filed: Mar. 21, 2011

(65) Prior Publication Data

US 2011/0317089 A1 Dec. 29, 2011

(30) Foreign Application Priority Data

Jun. 25, 2010 (JP) .................................. 2010-144566
Dec. 20, 2010 (JP) .................................. 2010-283082

(51) Int. Cl.
*G02F 1/13357* (2006.01)
*F21S 2/00* (2006.01)
*F21V 23/00* (2006.01)

(52) U.S. Cl.
USPC .................... 349/61; 349/58; 349/64; 349/65; 362/97.2; 362/612

(58) Field of Classification Search
USPC .......... 349/58, 61, 65, 64; 362/607, 612, 630, 362/31, 633, 97.2, 97.3
See application file for complete search history.

(56) References Cited

U.S. PATENT DOCUMENTS

| 7,245,143 | B2 | 7/2007 | Hasegawa et al. | |
|---|---|---|---|---|
| 2005/0277216 | A1 | 12/2005 | Asakawa | |
| 2009/0121652 | A1* | 5/2009 | Kang et al. | 315/297 |
| 2009/0207125 | A1 | 8/2009 | Park et al. | |
| 2009/0302780 | A1 | 12/2009 | Kim et al. | |
| 2011/0069091 | A1* | 3/2011 | Kim et al. | 345/690 |

FOREIGN PATENT DOCUMENTS

| CN | 1725064 A | 1/2006 |
|---|---|---|
| CN | 101640338 A | 2/2010 |

(Continued)

OTHER PUBLICATIONS

Korean Office Action dated Aug. 27, 2012 in Korean Patent Application No. 10-2011-0038936 along with an English translation of relevant portion of same.

(Continued)

*Primary Examiner* — Dung Nguyen
*Assistant Examiner* — Tai Duong
(74) *Attorney, Agent, or Firm* — Collard & Roe, P.C.

(57) ABSTRACT

A light-emitting element substrate mounting light-emitting elements is arranged on a front face of a chassis. The light-emitting element substrate is connected to a first connector. A power supply substrate for supplying electric power to the light-emitting element substrate is arranged on a rear face of the chassis. A second connector is connected to the power supply substrate. In addition, the first and the second connectors are connected to each other, so that the power supply substrate supplies electric power to the light-emitting element substrate via the first connector and the second connector. The second connector may electrically be connected to the power supply substrate via a harness.

11 Claims, 34 Drawing Sheets

(56) References Cited

FOREIGN PATENT DOCUMENTS

| | | |
|---|---|---|
| JP | 61-171177 | 8/1986 |
| JP | 2009-37922 | 2/2009 |
| JP | 2009-210848 | 9/2009 |
| JP | 2009-295587 | 12/2009 |
| KR | A-2008-012693 | 2/2008 |
| KR | A-2009-089019 | 8/2009 |

OTHER PUBLICATIONS

Japanese Office Action mailed May 16, 2012 in Japanese Patent Application No. 2010-283082 along with an English translation of relevant portion of same.

Chinese Office Action dated Aug. 19, 2013 in Chinese Application No. 201110150770.0 with English translation.

* cited by examiner

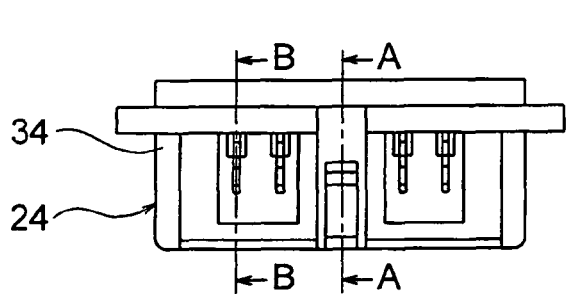
FIG. 26A
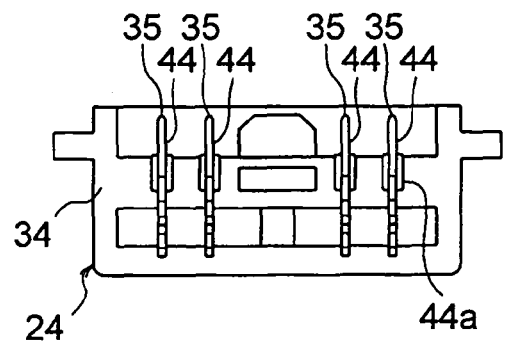
FIG. 26B
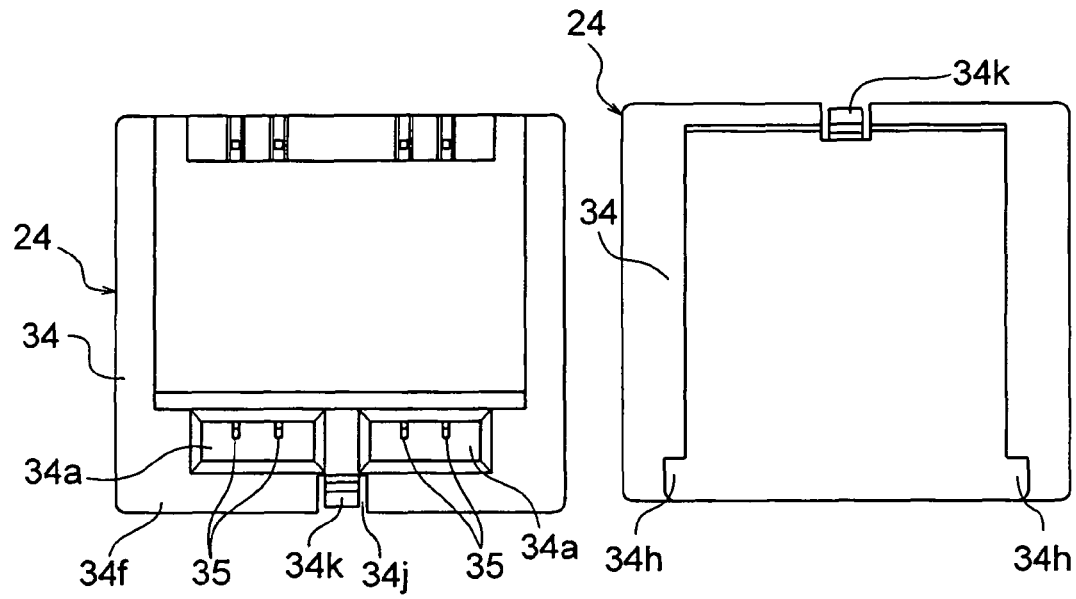
FIG. 26C
FIG. 26D
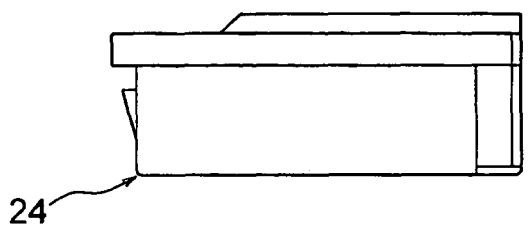
FIG. 26E

BACKLIGHT ASSEMBLY FOR SUPPLYING ELECTRIC POWER TO A LIGHT-EMITTING ELEMENT VIA A CONNECTOR AND A BACKLIGHT UNIT AND A LIQUID CRYSTAL DISPLAY WHICH USE THE BACKLIGHT ASSEMBLY

This application is based upon and claims the benefit of priority from Japanese patent application Nos. 2010-144566, filed on Jun. 25, 2010 and 2010-283082, filed on Dec. 20, 2010, the disclosures of which are incorporated herein in their entirely by reference.

TECHNICAL FIELD

The present invention relates to a backlight assembly for a display apparatus and to a backlight unit and a liquid crystal display apparatus which use the backlight assembly.

BACKGROUND ART

Display devices using liquid crystals are widely used for portable devices, computers, wide-screen televisions, and the like because they are lighter in weight, are thinner, and consume less electric power as compared to conventional display devices such as a cathode ray tube. Liquid crystals do not emit light by themselves. Therefore, a backlight unit may be used for emitting light from behind liquid crystals to display a screen on a display device. Generally, a backlight unit includes a backlight assembly having a light-emitting element substrate including light-emitting elements such as light-emitting diodes (LEDs), a power supply substrate for supplying electric power and control signals to the light-emitting elements, and an electric conduction path connecting the light-emitting element substrate and the power supply substrate to each other.

For example, there has been known a backlight assembly having a structure including a chassis, a light-emitting element substrate fixed on a front face of the chassis, a power supply substrate fixed on a rear face of the chassis, and a harness passed through a hole formed in the chassis. The harness is used as an electric conduction path electrically connecting the light-emitting element substrate and the power supply substrate. See JP-A 2009-295587 (Patent Document 1). In the backlight assembly having such a structure, the hole of the chassis should be closed such that dust such as fine particles does not enter the backlight unit.

Next, an example of a backlight assembly having a structure that is different from but similar to the structure disclosed in Patent Document 1 will be described with reference to FIGS. 31 to 33.

As shown in FIGS. 31 and 32A to 32C, the backlight assembly has a chassis 103 having a frame 103b formed on a periphery of a front face of the chassis 103. The backlight assembly includes light-emitting element substrates 123a-123f screwed on the frame 103b. In FIGS. 32A to 32C, the light-emitting element substrates 123d, 123e, and 123f are omitted from the illustration. Each of the light-emitting element substrates 123a-123f includes light-emitting elements 131, such as LEDs, and a light-emitting element connector 133.

Meanwhile, as shown in FIG. 33, the backlight assembly has a power supply substrate 237 screwed on a rear face of the chassis 103. The power supply substrate 237 supplies electric power and control signals to the light-emitting element substrates 123a-123f. The power supply substrate 237 has power supply substrate connectors 235 mounted thereon.

The light-emitting element substrates 123a-123f and the power supply substrate 237 are electrically connected to each other via a harness 233. Specifically, the harness 233 has light-emitting element connectors 143 formed on one side of the harness 233 and power supply substrate connectors (not shown) formed on the other side of the harness 233. The light-emitting element connectors 143 are connected to the light-emitting element connectors 133. The power supply substrate connectors are connected to the power supply substrate connectors 235.

The chassis 103 has a hole 234 formed therein for allowing the harness 233 to pass therethrough. The hole 234 is filled with a rubber plug 231. The rubber plug 231 has small holes 231a like slits for allowing the harness 233 to pass therethrough.

In order to assemble such a backlight assembly, the following steps are required:

1) The light-emitting element substrates 123a-123f are attached to the chassis 103.

2) The light-emitting element connectors 143 of the harness 233 are connected to the light-emitting element connectors 133 of the light-emitting element substrates 123a-123f. Then the harness 233 is drawn out of the hole 234 toward the rear face of the chassis 103.

3) The hole 234 is filled with the rubber plug 231.

4) The power supply substrate 237 is fixed to the rear face of the chassis 103.

5) The power supply substrate connectors 235 of the power supply substrate 237 are connected to the power supply substrate connectors of the harness 233.

SUMMARY OF THE INVENTION

In the above structure, the substrates (the light-emitting element substrates 123a-123f and the power supply substrate 237) on the front and rear faces of the chassis are connected to each other with the connectors by passing the harness through the hole of the chassis. However, such a structure inevitably requires the rubber plug 231, the light-emitting element connectors 133, the power supply substrate connectors 235, and the harness 233 having the connectors on both sides thereof. Accordingly, it is difficult to further reduce the number of parts required for the backlight assembly and thus to achieve cost reduction.

Furthermore, when the backlight assembly is assembled, the above structure requires a process of passing the harness through the hole of the chassis and connecting the harness to the substrates on the front and rear faces of the chassis. For a structure in which components are assembled by stacking, such as a backlight unit of a liquid crystal display device, a process of passing a harness through a hole considerably worsens the workability and increases the man-hour. As a result, the manufacturing cost is problematically increased.

Moreover, some liquid crystal display devices use the same harness and light-emitting element substrates and use different power supply substrates depending upon the characteristics of the liquid crystal display devices. With the aforementioned structure, connectors corresponding to the connectors of the harness should be mounted on the power supply substrate irrespective of the kind of the power supply substrate. Therefore, the flexibility of designing the power supply substrate is reduced, thereby increasing cost.

It is therefore an exemplary object of the present invention to provide a backlight assembly, which facilitates cost reduction as compared to conventional technology.

It is another object of the present invention to provide a backlight unit and a liquid crystal display apparatus, which use the backlight assembly.

Other objects of the present invention will become clear as the description proceeds.

According to an exemplary aspect of the present invention, there is provided a backlight assembly which comprises a chassis which has a front face and a rear face, a light-emitting element substrate which is arranged on the front face of the chassis and mounts a light-emitting element, a power supply substrate which is arranged on the rear face of the chassis for supplying electric power to the light-emitting element substrate, a first connector which is held on the chassis and connected to the light-emitting element substrate, and a second connector which is connected to the power supply substrate and to the first connector, whereby the electric power is supplied from the power supply substrate to the light-emitting element substrate via the first connector and the second connector.

According to another exemplary aspect of the present invention, there is provided a backlight unit which comprise the above-mentioned backlight assembly and an optical system which is arranged in front of the chassis.

According to still another exemplary aspect of the present invention, there is provided a liquid crystal display apparatus which comprises the above-mentioned backlight unit and a liquid crystal display portion, wherein the optical system is arranged between the backlight assembly and the liquid crystal display portion.

BRIEF DESCRIPTION OF THE DRAWINGS

FIG. 26A is a front view showing the first connector of the second embodiment;

FIG. 26B is a rear view showing the first connector of the second embodiment;

FIG. 26C is a plan view showing the first connector of the second embodiment;

FIG. 26D is a bottom view showing the first connector of the second embodiment;

FIG. 26E is a right side view showing the first connector of the second embodiment;

DESCRIPTION OF THE EMBODIMENTS

With reference to the drawings, description will be made as regards embodiments of the present invention.

Figure 1:
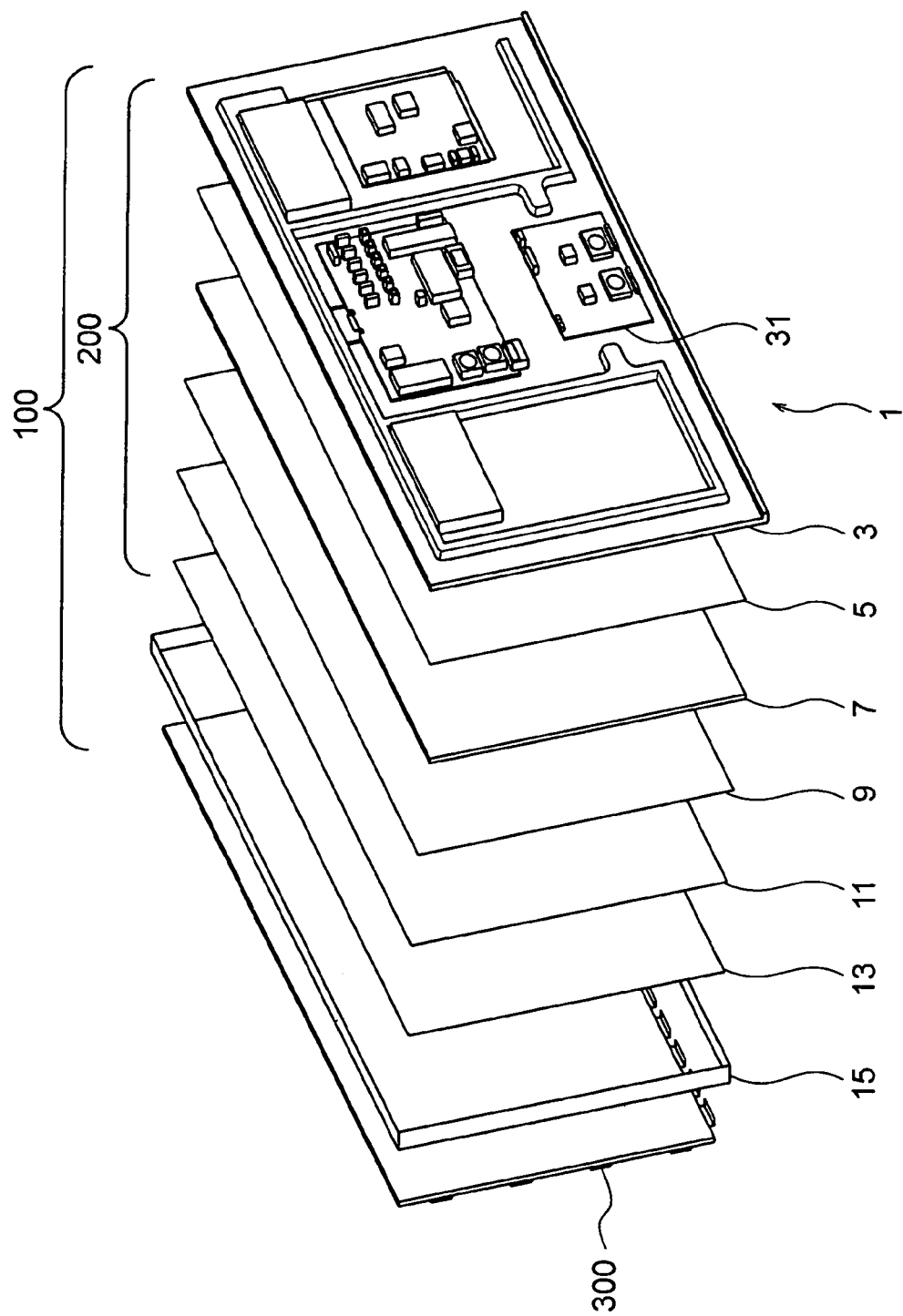
FIG. 1 is an exploded perspective view of a liquid crystal display apparatus.

Referring to FIG. 1 at first, the description will be directed to an overview structure of a liquid crystal display apparatus 100.

As shown in FIG. 1, the liquid crystal display apparatus 100 has a liquid crystal display portion 300 using liquid crystals and arranged on a front side of the liquid crystal display apparatus 100, a backlight unit 200 arranged on a rear side of the liquid crystal display apparatus 100 for emitting light to the liquid crystal display portion 300, and a frame 15 housing or mounting the liquid crystal display portion 300 and the backlight unit 200 therein. The backlight unit 200 includes a backlight assembly 1 and an optical system arranged in front of the backlight assembly 1, i.e., between the backlight assembly 1 and the liquid crystal display portion 300.

The backlight assembly 1 includes a chassis 3 made of metal. The optical system includes a reflective sheet 5, a light guide plate 7, a diffusive sheet 9, a prism sheet 11, and a condensing sheet 13, which are stacked in front of the chassis 3 in the order named.

This liquid crystal display apparatus 100 can be used in a liquid crystal display monitor of a television receiver or the like.

Next referring to FIGS. 2 to 9, the description will be directed to a backlight assembly according to a first embodiment of the present invention and to a method of manufacturing the backlight assembly.

Figure 2:
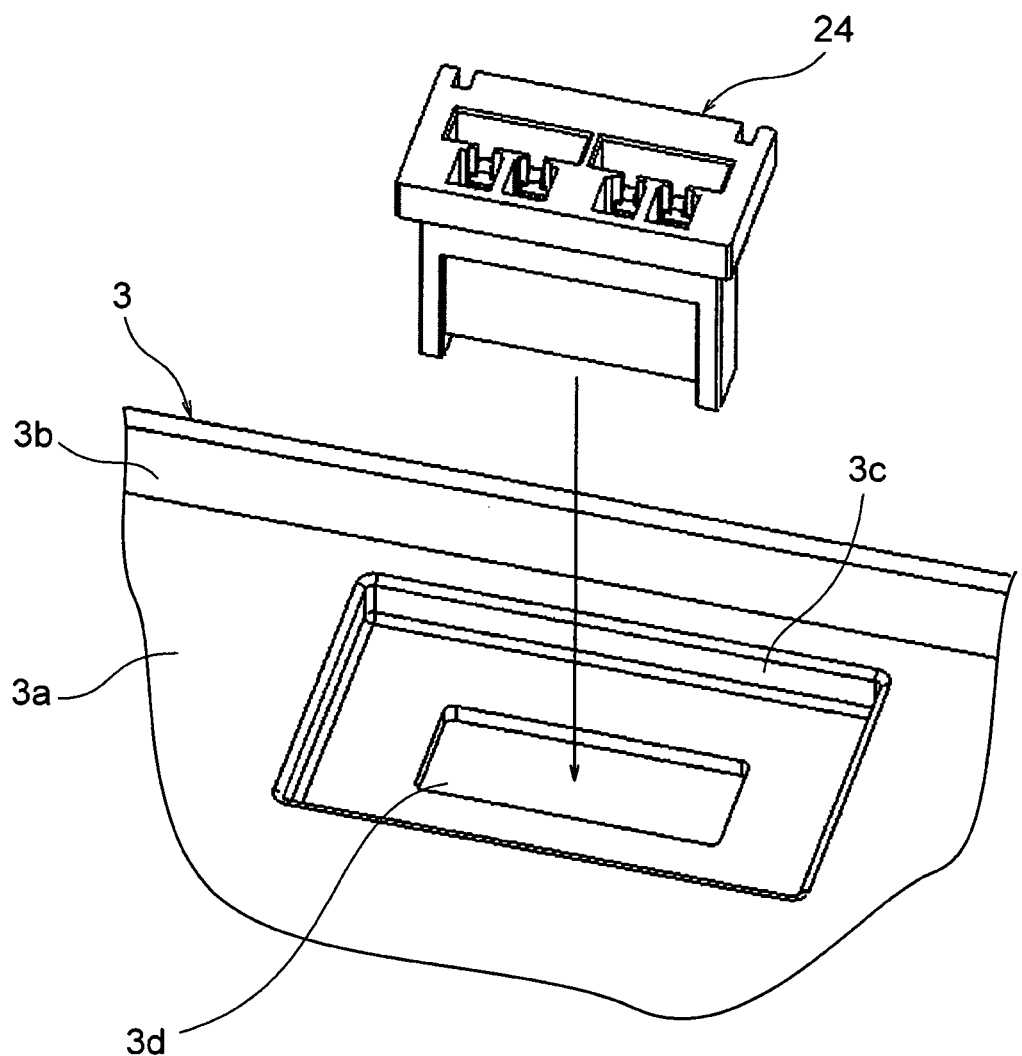
FIG. 2 is an exploded perspective view explanatory of a process of attaching a first connector to a chassis of a backlight assembly according to a first embodiment of the present invention.
Figure 3:
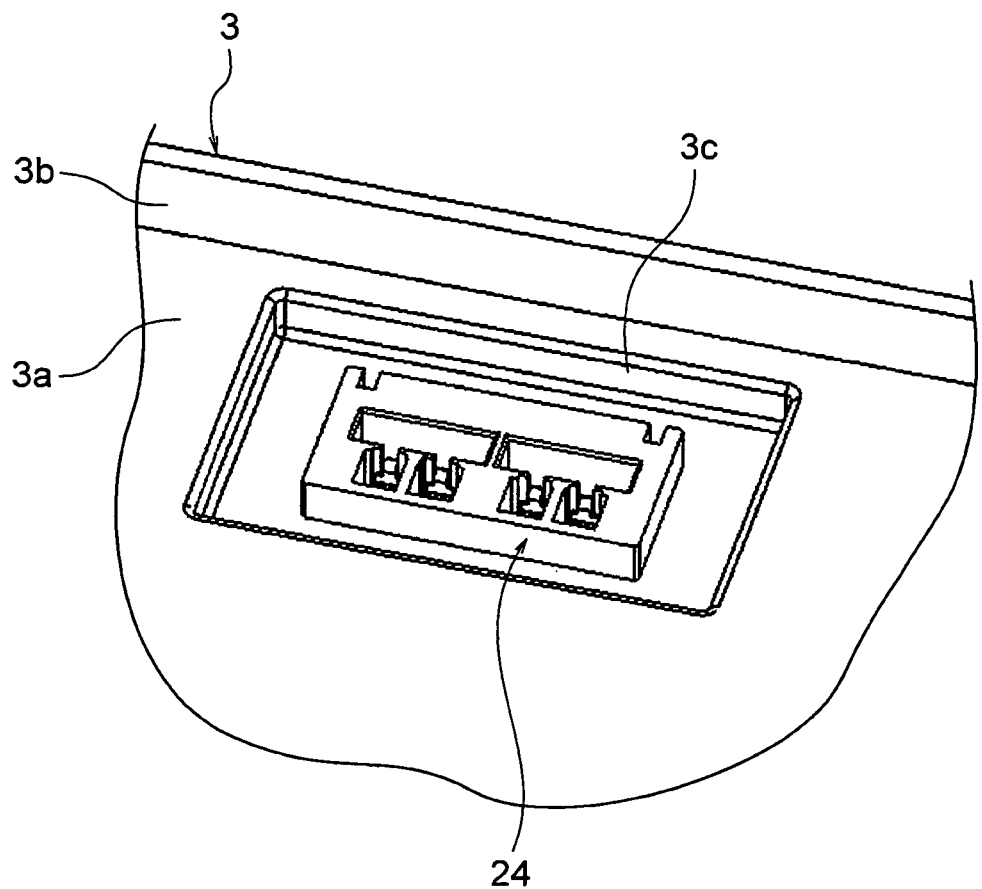
FIG. 3 is a perspective view showing a state in which the first connector has been mounted on the chassis in the first embodiment.
Figure 6A:
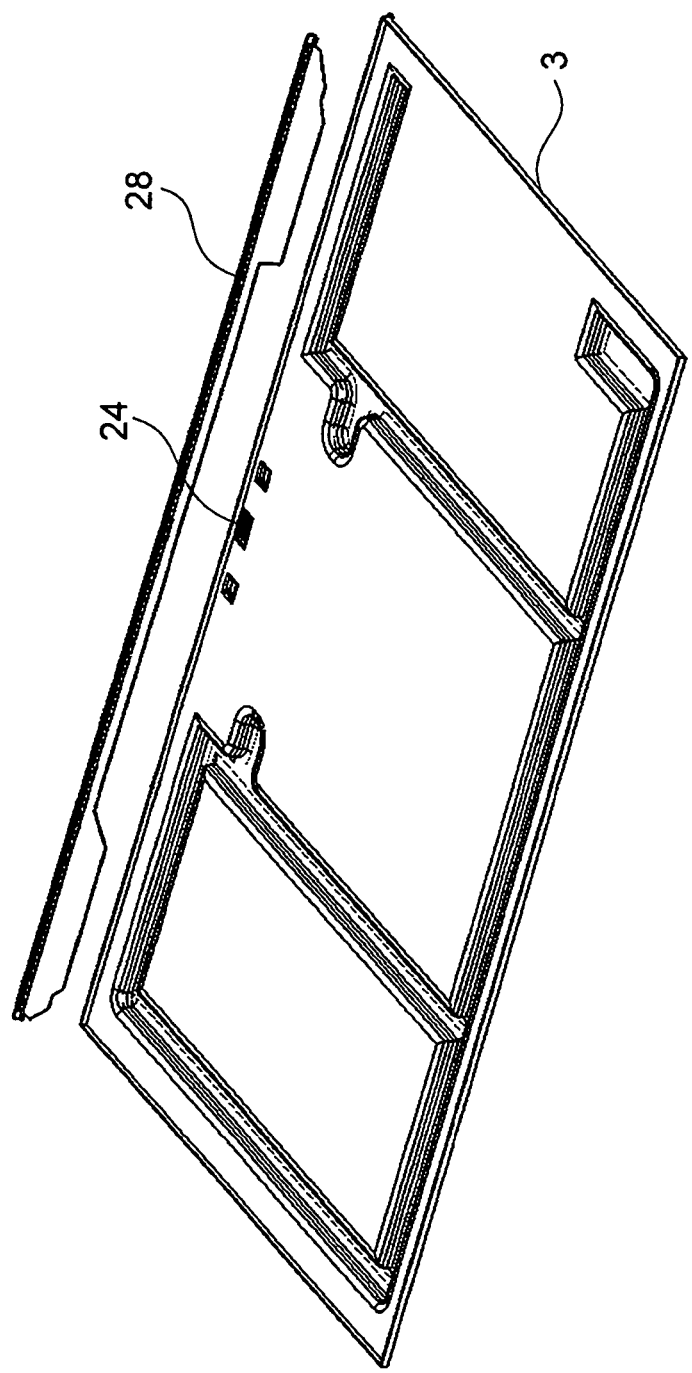
FIG. 6A is a perspective view showing that the part shown in FIG. 5A is to be attached to the chassis.

In FIG. 2, the chassis 3 includes a base plate portion 3a in the form of a rectangular plate and a frame plate portion 3b extending frontward from each side or the vicinity thereof of the base plate portion 3a. The base plate portion 3a has a recessed portion 3c recessed in a front face of the base plate portion 3a. The recessed portion 3c is located near the frame plate portion 3b on one side of the base plate portion 3a. The recessed portion 3c has a bottom with a chassis hole portion 3d formed therein. A first connector 24, which will be described later, is inserted into the chassis hole portion 3d and fixed in the chassis hole portion 3d. FIG. 3 shows a state in which the first connector 24 has been mounted on the chassis 3. The entire chassis 3 on which the first connector 24 has been mounted is illustrated in FIG. 6A.

Figure 4A:
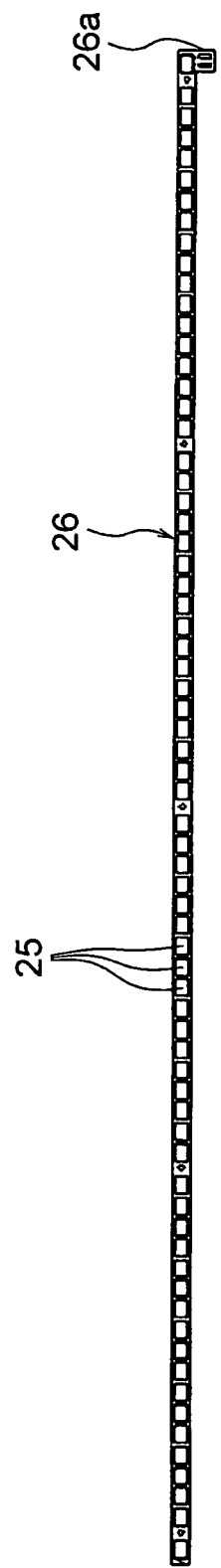
FIG. 4A is a plan view of a light-emitting element substrate attached to the chassis in the first embodiment.
Figure 4B:
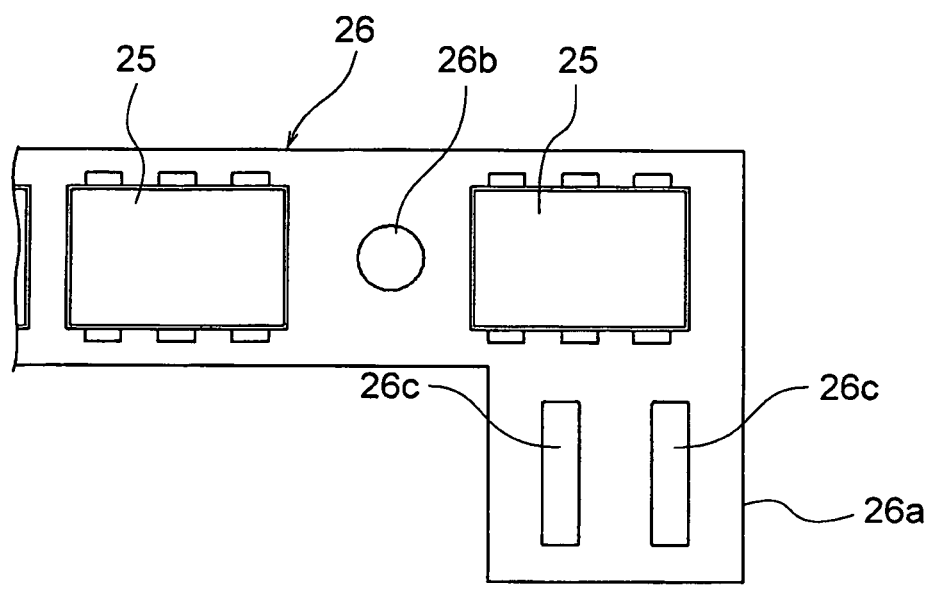
FIG. 4B is an enlarged view showing part of FIG. 4A.
Figure 5A:
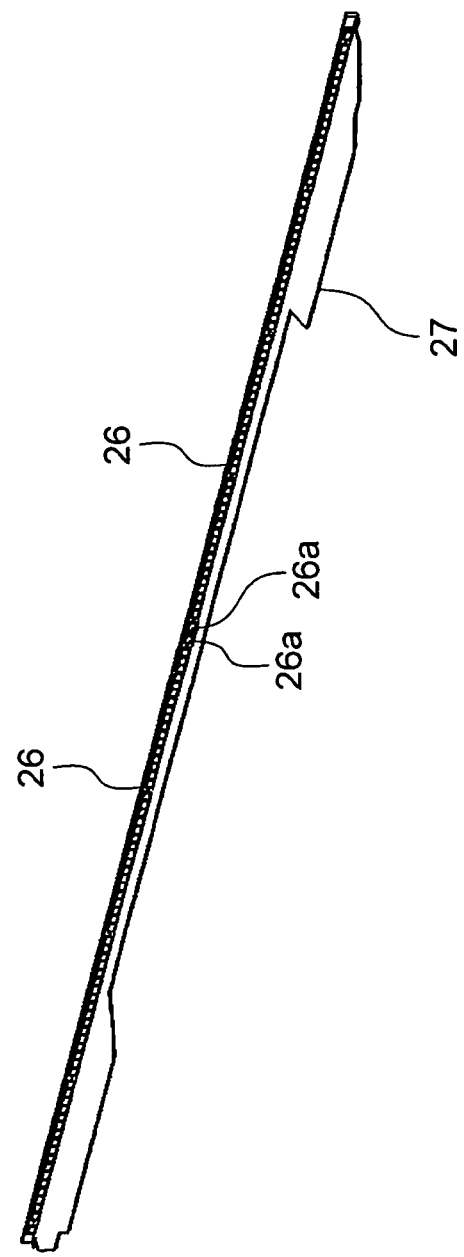
FIG. 5A is a perspective view showing a part in which a heat sink member is attached to light-emitting element substrates in the first embodiment.
Figure 5B:
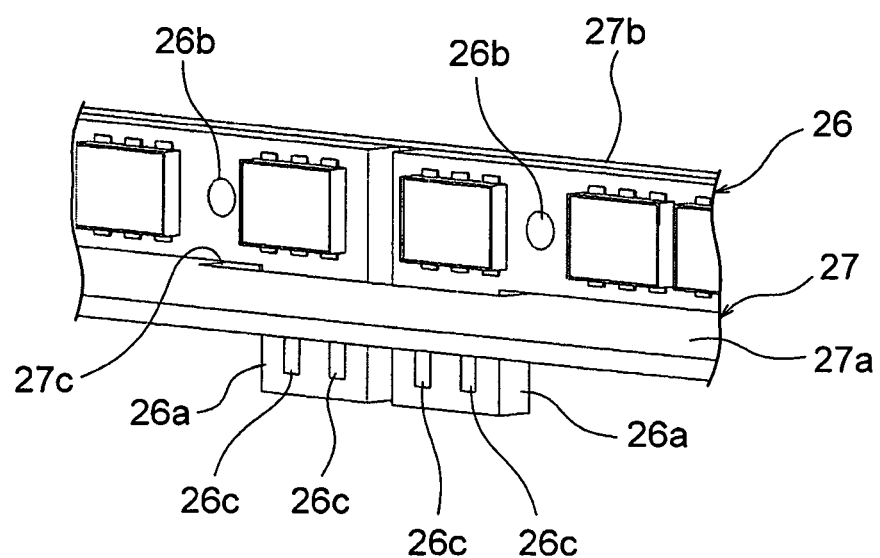
FIG. 5B is an enlarged view showing part of FIG. 5A.

Furthermore, two elongated light-emitting element substrates 26 are prepared. As shown in FIGS. 4A and 4B, a large number of light-emitting elements 25 such as light emitting diodes (LEDs) are mounted in a row on a surface of each of the light-emitting element substrates 26. As shown in FIGS. 5A and 5B, the light-emitting element substrates 26 are arranged in series on one heat sink member 27. Those light-emitting element substrates 26 have substrate protrusions 26a formed on ends of the light-emitting element substrates 26 adjacent to each other so as to extend in parallel to each other toward the same width direction. The heat sink member 27 includes a backing portion 27a, which faces surfaces opposite to the surfaces of the light-emitting element substrates 26 on which the light-emitting elements 25 are mounted, a heat sink portion 27b perpendicular to the backing portion 27a, and a protrusion insertion slot 27c formed in the heat sink portion 27b.

The light-emitting element substrates 26 are attached to heat sink member 27 in a state in which the substrate protrusions 26a are inserted in the protrusion insertion slot 27c. The light-emitting element substrates 26 are screwed on the heat sink member 27 with use of a plurality of screw holes 26b spaced in the longitudinal direction. Furthermore, each of the substrate protrusions 26a has a surface having two conductive contact portions 26c exposed to an opposite side of the heat sink portion 27b through the protrusion insertion slot 27c. Those contact portions 26c are connected to the light-emitting elements 25 via a circuit of the light-emitting element substrate 26.

Figure 6B:
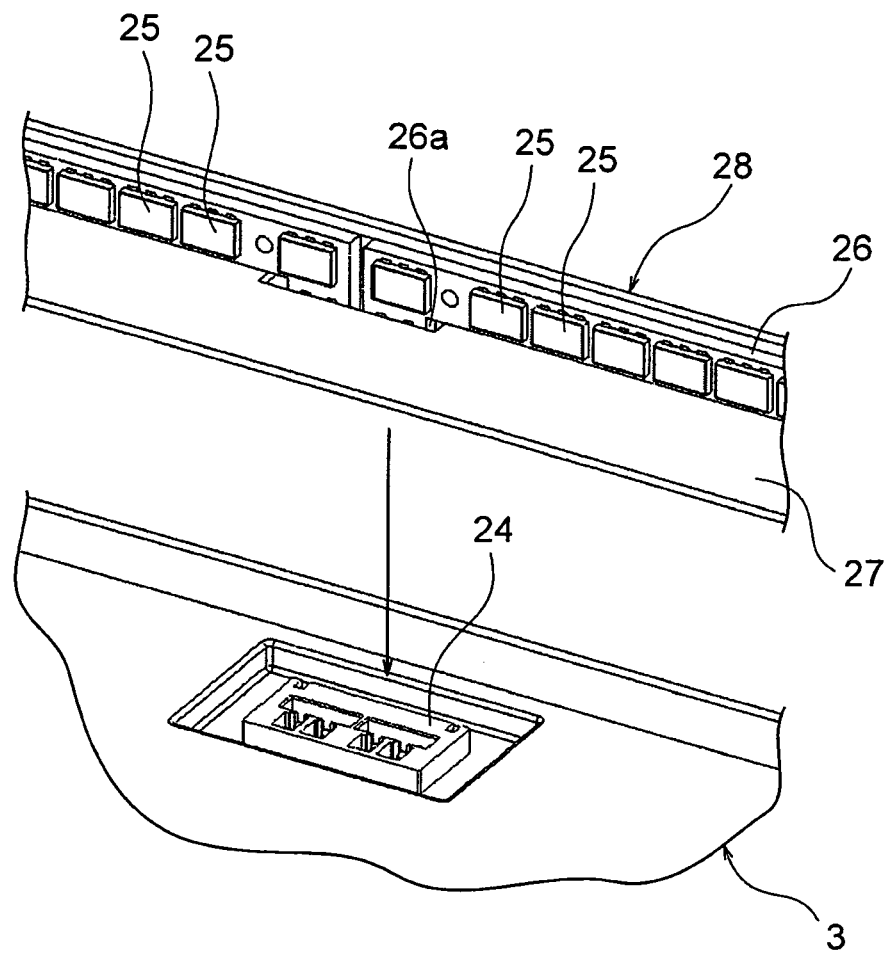
FIG. 6B is an enlarged view showing part of FIG. 6A.

The heat sink member 27 is attached to the light-emitting element substrates 26 to thereby produce a light-emitting part 28. As shown in FIGS. 6A and 6B, the light-emitting part 28 is arranged on the front face of the chassis 3 on which the first connector 24 has been mounted. The substrate protrusions 26a are inserted into the first connector 24, and the heat sink member 27 is screwed on the chassis 3. Thus, a large number of light-emitting elements 25, to which a current can be supplied via the first connector 24, are arranged and fixed near one edge of the chassis 3 along the edge at a front side of the backlight assembly 1 shown in FIG. 1.

Meanwhile, as shown in FIG. 1, a power supply substrate 31 is provided on a rear side of the backlight assembly 1 for supplying electric power to the light-emitting element substrates 26. The power supply substrate 31 is arranged in parallel to the rear face of the chassis 3 and screwed on the chassis 3.

Figure 7:
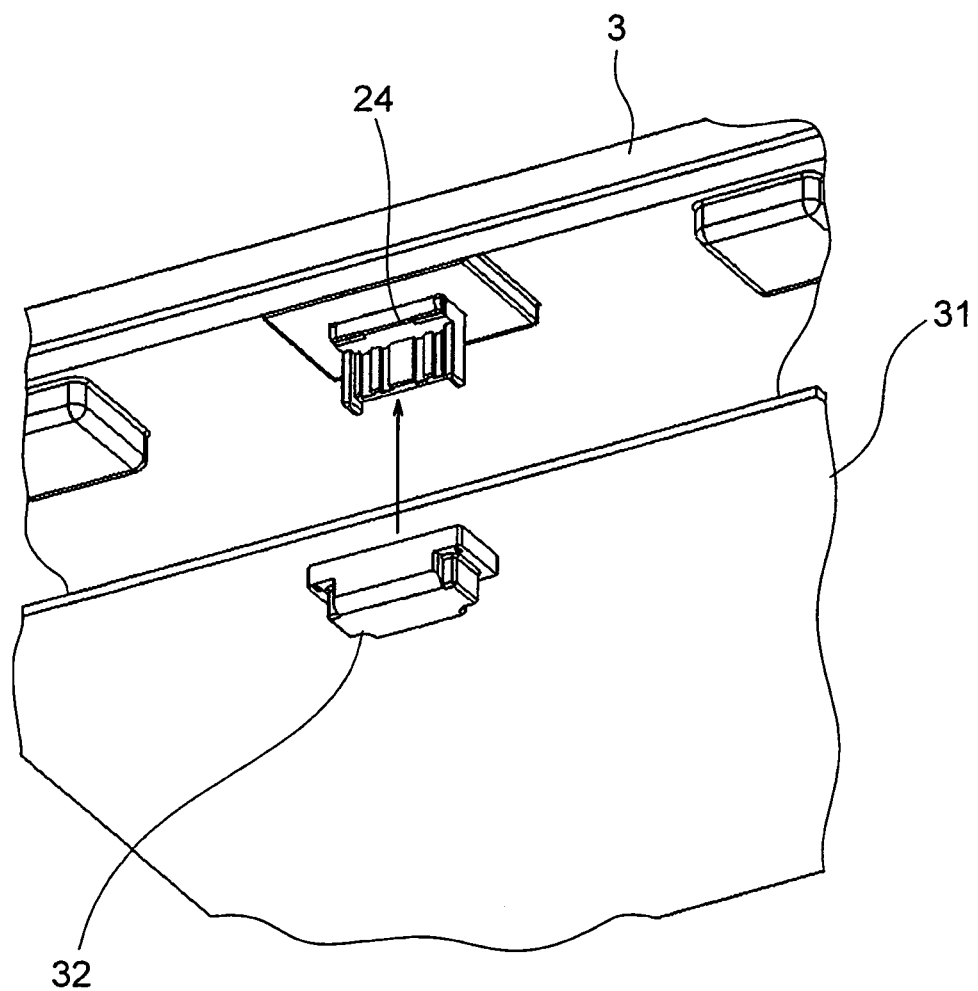
FIG. 7 is an exploded perspective view explanatory of a process of attaching a power supply substrate having a second connector to the chassis in the first embodiment.
Figure 8:
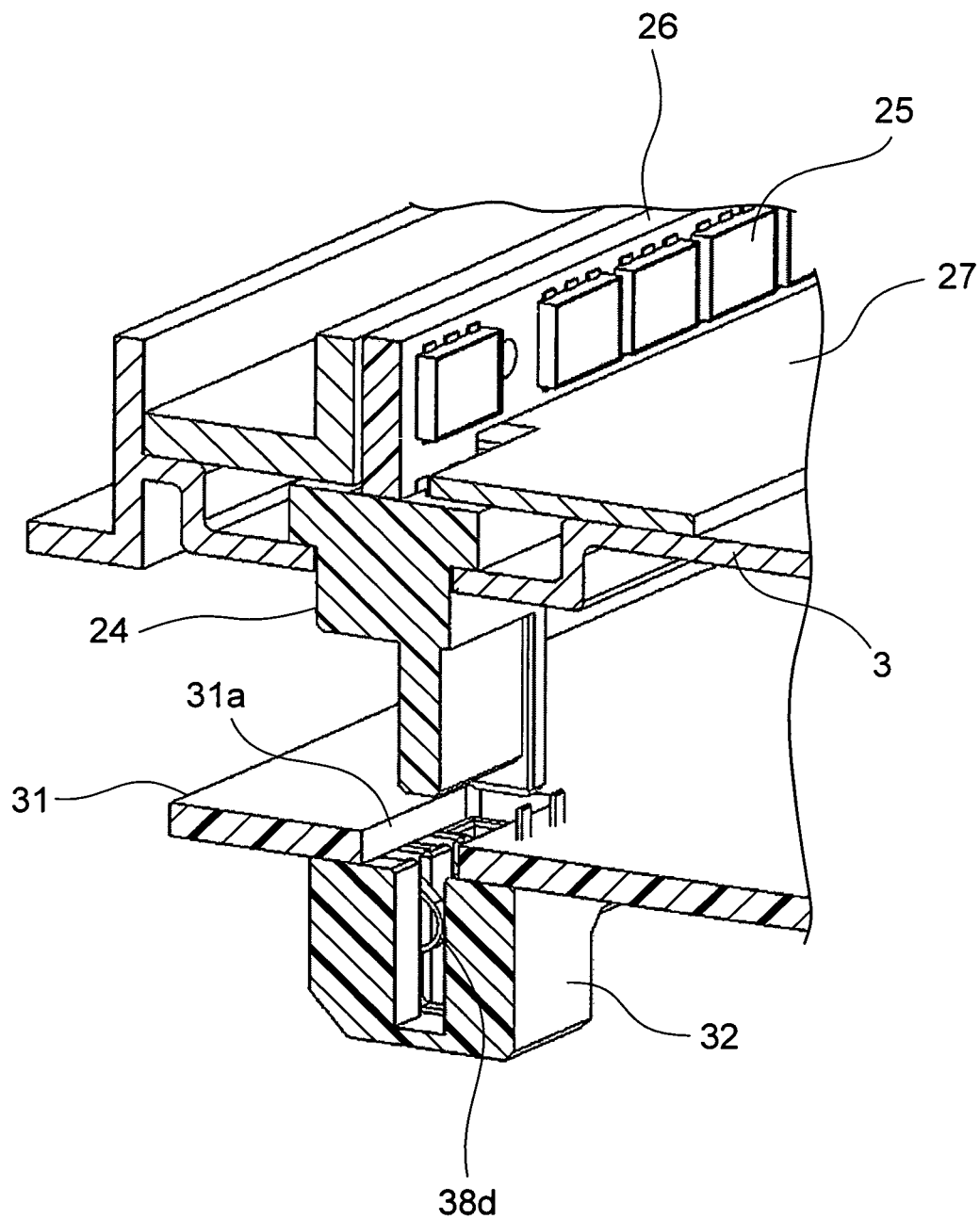
FIG. 8 is an enlarged perspective view showing a primary part of FIG. 7 partially in cross-section.

As shown in FIGS. 7 and 8, a second connector 32, which will be described later in detail, is mounted on a rear face of the power supply substrate 31. The second connector 32 can be fitted or mated to the first connector 24 and electrically connected thereto. In other words, the second connector 32 provides an electric connection with the first connector 24 with fitting therebetween. The power supply substrate 31 has a mating hole 31a corresponding to the second connector 32 for allowing the first connector 24 to be mated with the second connector 32.

Figure 9:
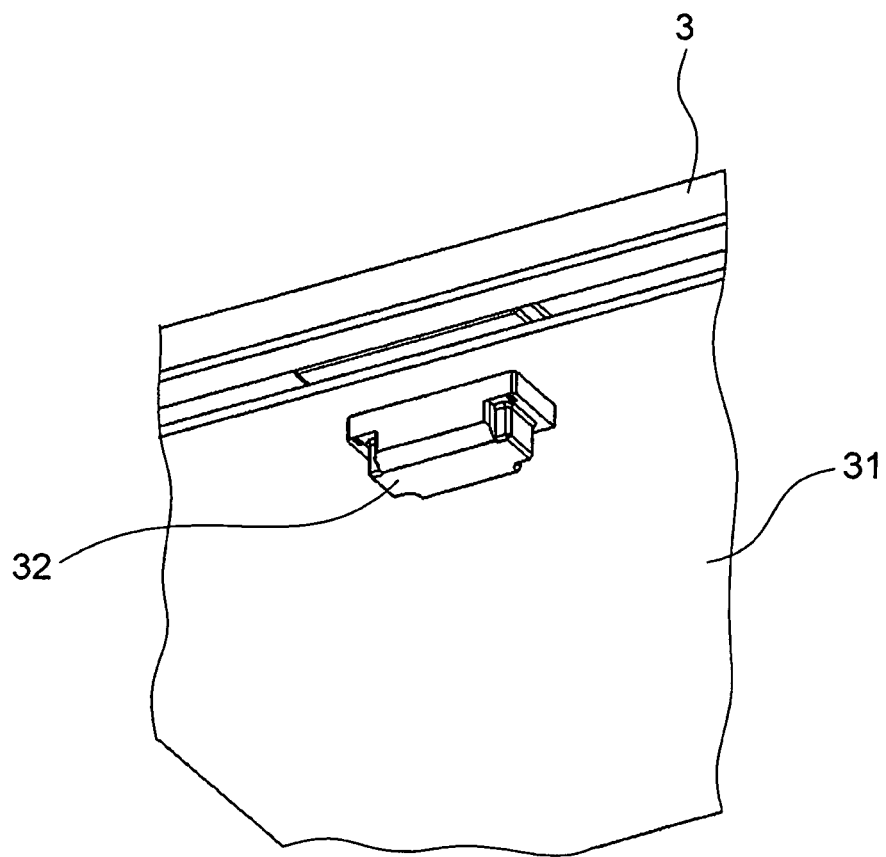
FIG. 9 is a perspective view showing a state in which the power supply substrate has been attached to the chassis in the first embodiment.
Figure 10A:
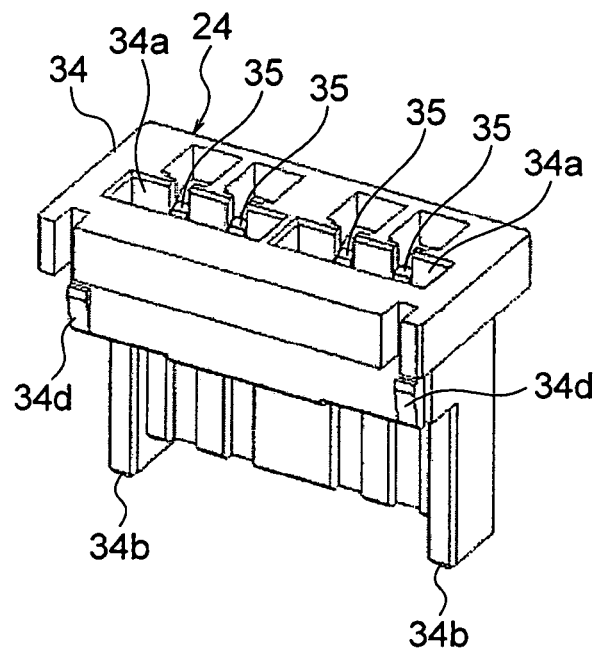
FIG. 10A is a perspective view showing the first connector of the first embodiment.
Figure 10B:
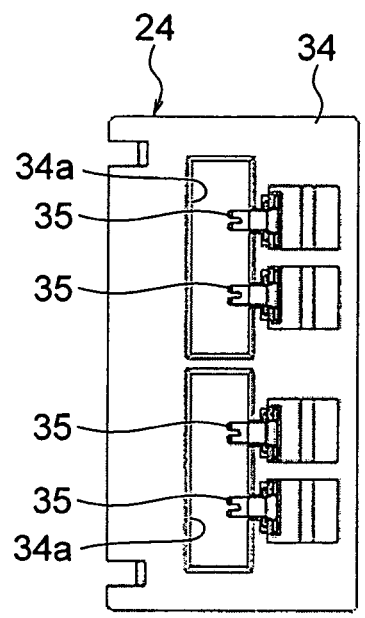
FIG. 10B is a plan view showing the first connector of the first embodiment.
Figure 10C:
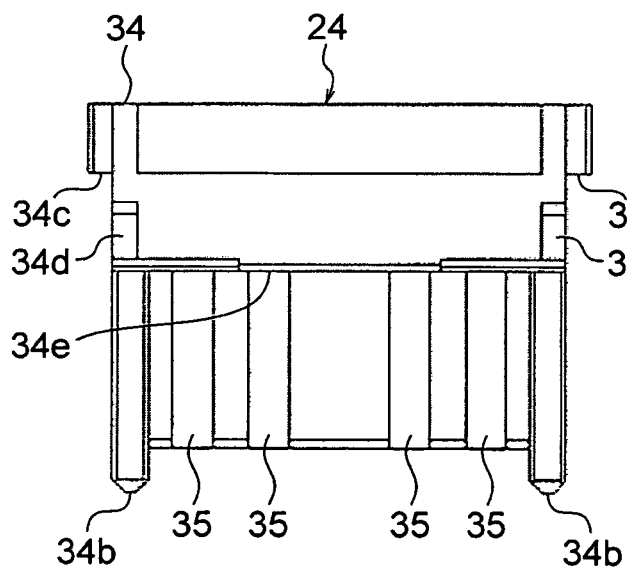
FIG. 10C is a front view showing the first connector of the first embodiment.
Figure 10D:
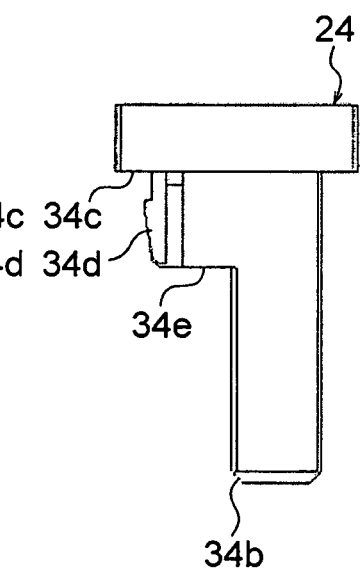
FIG. 10D is a side view showing the first connector of the first embodiment.
Figure 11:
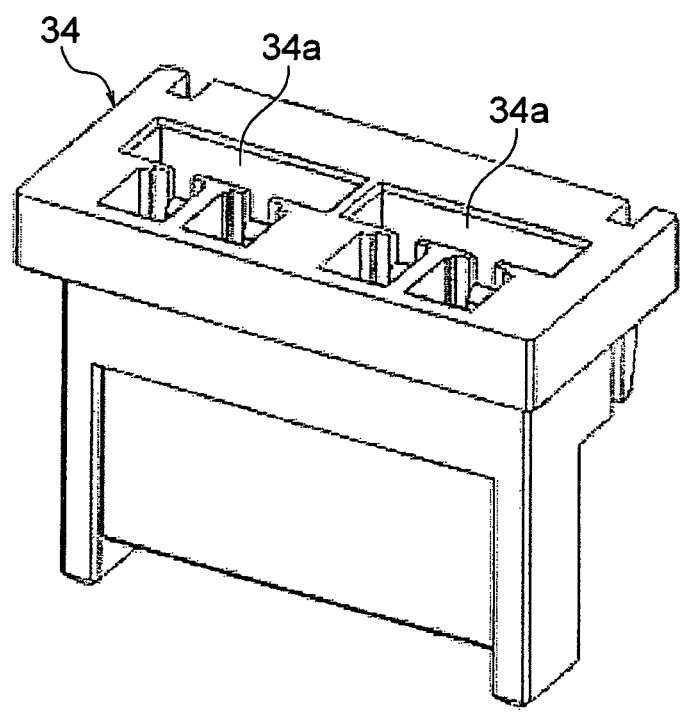
FIG. 11 is a perspective view showing a first housing included in the first connector of the first embodiment.

FIG. 9 shows a state in which the power supply substrate 31 has been arranged and fixed on the rear face of the chassis 3 by mating the first connector 24 with the second connector 32.

Now the first connector 24 will be described with reference to FIGS. 10A to 12 as well as FIGS. 1 to 9.

The first connector 24 includes a first housing 34 piercing or penetrating the chassis 3 and four first contacts 35 held on the first housing 34. The first housing 34 is made of an insulating material to have nonconductivity, whereas the first contacts 35 are made of a conductive material to have conductivity.

The first housing 34 has two substrate insertion slots 34a into which two substrate protrusions 26a are inserted, a pair of insertion guide parts 34b for leading the first connector 24 to be mated with the second connector 32, a chassis abutment surface 34c that abuts the chassis 3 when the first connector 24 is inserted in the chassis hole portion 3d, a pair of chassis engagement hooks 34d having spring characteristics for binding or fixing the first connector 24 to the chassis 3, and a connector abutment surface 34e that abuts the substrate 31 when the first connector 24 is mated with the second connector 32. The chassis engagement hooks 34d serve as a chassis engagement portion in cooperation with the chassis abutment surface 34c. Each of the insertion guide parts 34b has a chamfered end to facilitate the insertion and guide.

Figure 12:
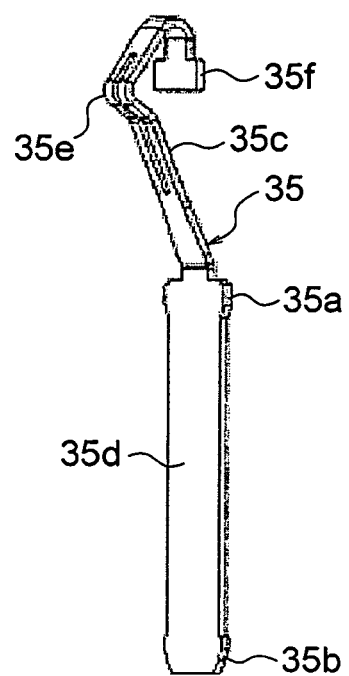
FIG. 12 is a perspective view showing a first contact included in the first connector of the first embodiment.
Figure 13A:
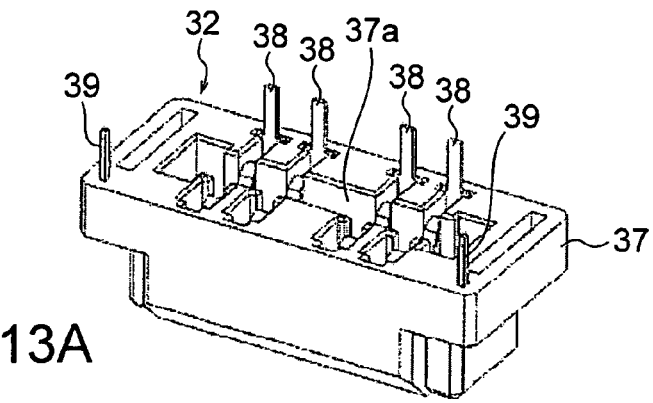
FIG. 13A is a perspective view showing the second connector of the first embodiment.
Figure 13B:
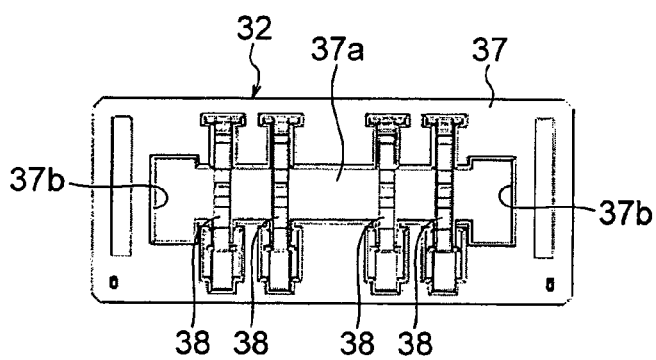
FIG. 13B is a plan view showing the second connector of the first embodiment.
Figure 13C:
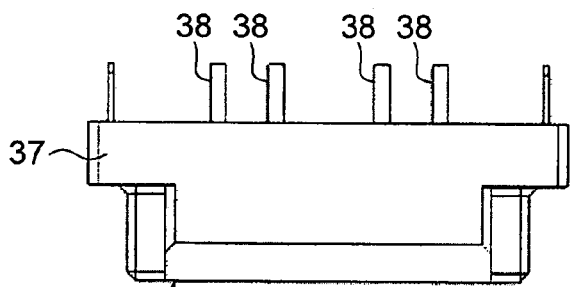
FIG. 13C is a front view showing the second connector of the first embodiment.
Figure 13D:
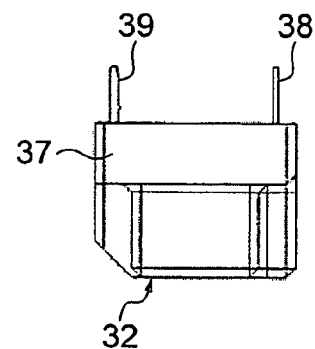
FIG. 13D is a side view showing the second connector of the first embodiment.
Figure 13E:
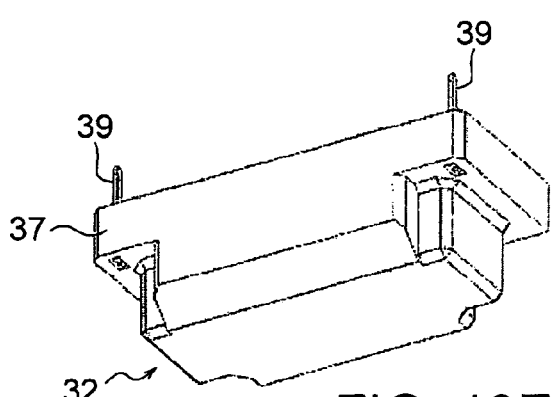
FIG. 13E is a perspective view showing the second connector of the first embodiment as viewed in a different direction.

As shown in FIG. 12, each of the first contacts 35 has two press-fit parts 35a and 35b press-fitted in the first housing 34. The press-fit part 35a, which is located in the middle of the first contact 35, will be referred to as an engagement portion engaging with the first housing 34. The first contact 35 has a spring part 35c located at one side of the engagement portion 35a and a connector contact part 35d located at the other side of the engagement portion 35a. The connector contact part 35d is in the form of a flat plate extending linearly. The spring part 35c includes a substrate contact part 35e that is brought into contact with the corresponding one of the contact portions 26c provided on the substrate protrusion 26a of the light-emitting element substrate 26. The spring part 35c also includes an urge prevention part 35f engaging with the first housing 34 for preventing an urge of the spring part 35c or for suppressing free movement thereof. The substrate contact part 35e is arranged within the substrate insertion slot 34a.

The second connector 32 will be described below with reference to FIGS. 13A to 15 as well as FIGS. 1 to 9.

The second connector 32 includes a second housing 37, four second contacts 38 held on the second housing 37, and a pair of hold-down parts 39 fixed on the second housing 37. The second housing 37 is made of an insulating material to have nonconductivity, whereas the second contacts 38 are made of a conductive material to have conductivity.

The second housing 37 has a mating recess portion 37a for receiving a portion of the first connector 24 that projects rearward through the chassis 3. The second housing 37 also has a pair of wide guide receiver parts 37b formed on opposite sides of the mating recess portion 37a for receiving the pair of the insertion guide parts 34b of the first housing 34. Each of the mating recess portions 37a has a chamfered portion around its inlet to facilitate the insertion and guide.

Figure 14:
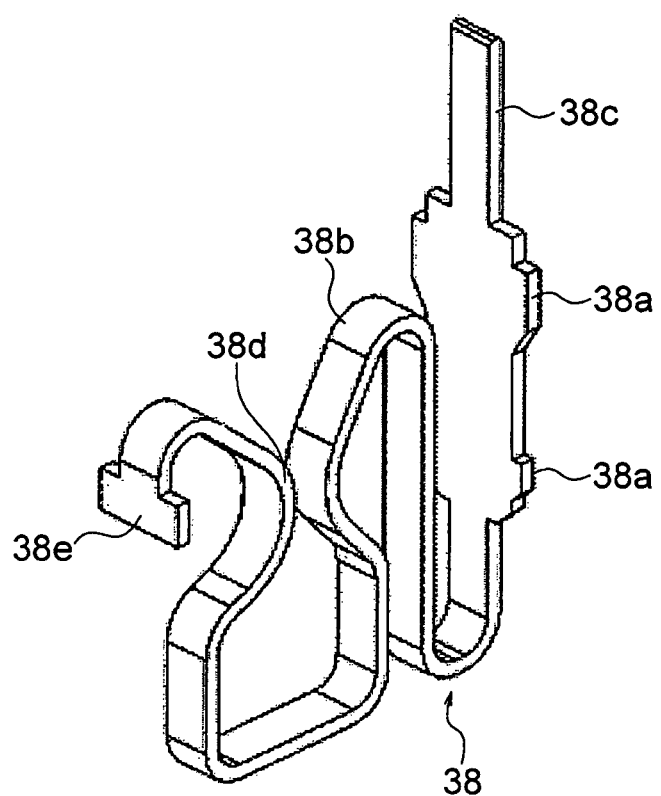
FIG. 14 is a perspective view showing a second contact included in the second connector of the first embodiment.

As shown in FIG. 14, each of the second contacts 38 has two press-fit parts or engagement portions 38a press-fitted in and engaged with the second housing 37, a spring part 38b located at one side of the engagement portion 38a, and a terminal part 38c located at the other side of the engagement portion 38a. The terminal part 38c is soldered in a through hole (not shown) formed in the power supply substrate 31 and connected to the power supply substrate 31. The spring part 38b extends so as to meander and includes a connector contact part 38d and an urge prevention part 38e. The connector contact part 38d is brought into contact with the connector contact part 35d of the first contact 35. The urge prevention part 38e engages with the second housing 37 for preventing an urge of the spring part 38b or for suppressing free movement thereof.

Figure 15:
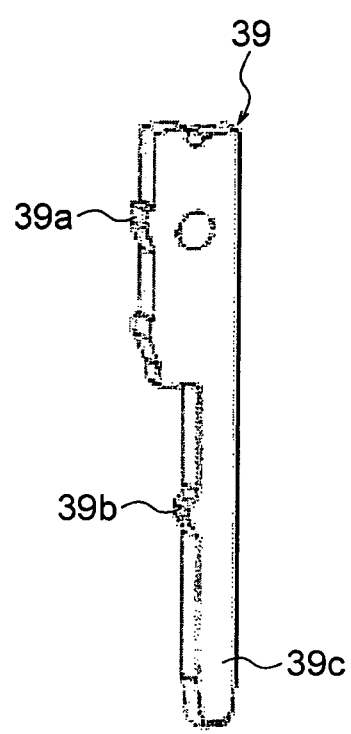
FIG. 15 is a perspective view showing a hold-down part included in the second connector of the first embodiment.

The hold-down parts 39 are produced by punching a metal plate. As shown in FIG. 15, each of the hold-down parts 39 includes a press-fit part 39a press-fitted in the second housing 37, a lift prevention part 39b for preventing lifting of the second connector 32 from the power supply substrate 31, and a substrate solder part 39c soldered in a through hole (not shown) formed in the power supply substrate 31 and fixed to the power supply substrate 31.

Figure 17:
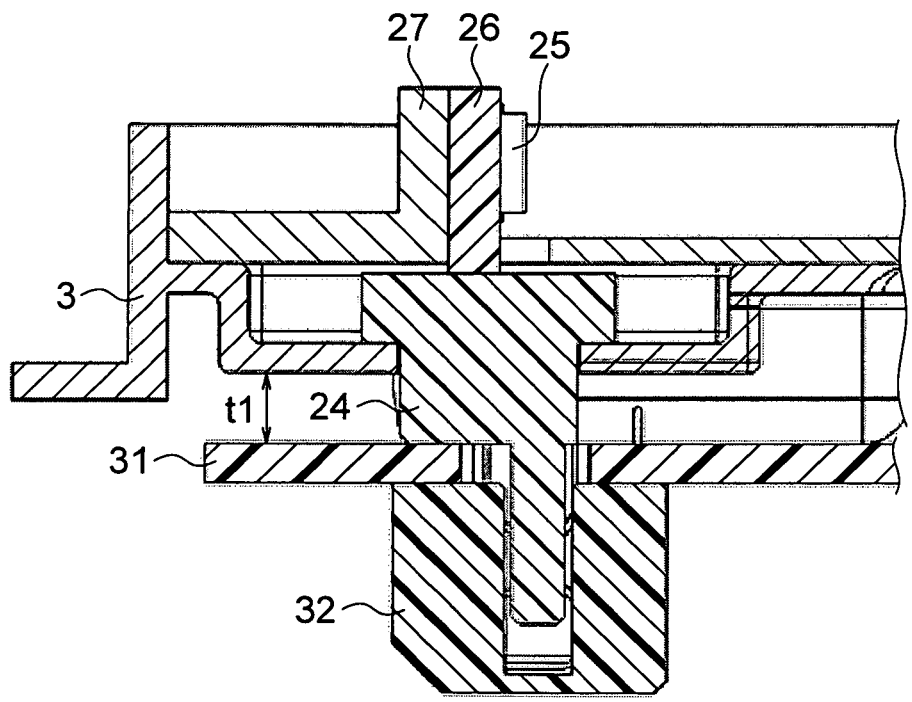
FIG. 17 is a cross-sectional view showing a first connection state of the first connector and the second connector in the first embodiment.
Figure 18:
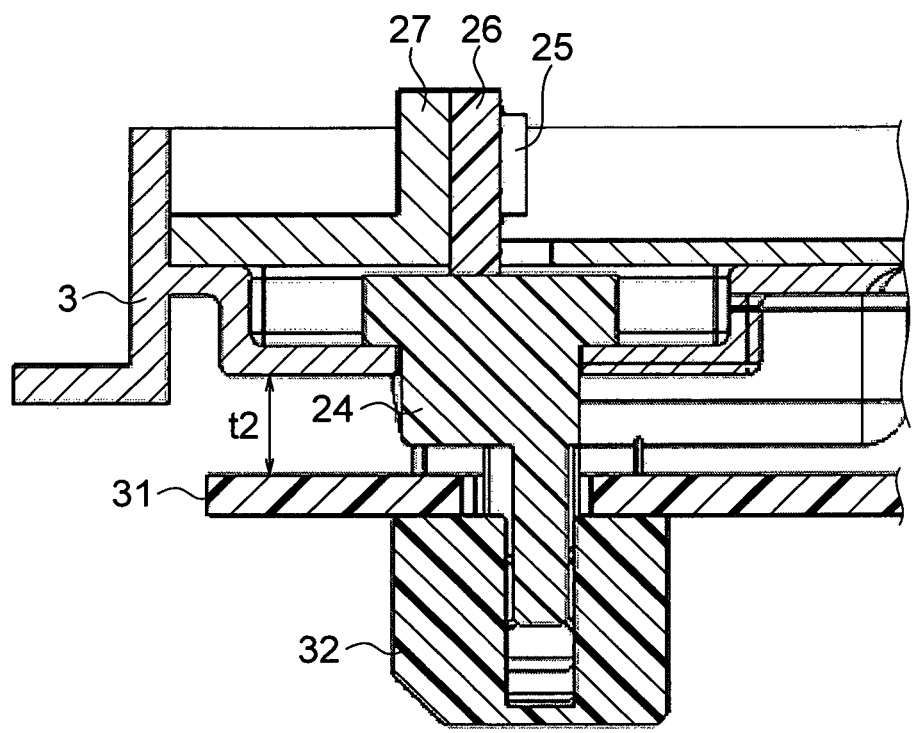
FIG. 18 is a cross-sectional view showing a second connection state of the first connector and the second connector in the first embodiment.

Connection between the first connector 24 and the second connector 32 will be described with reference to FIGS. 16 to 18.

Figure 16:
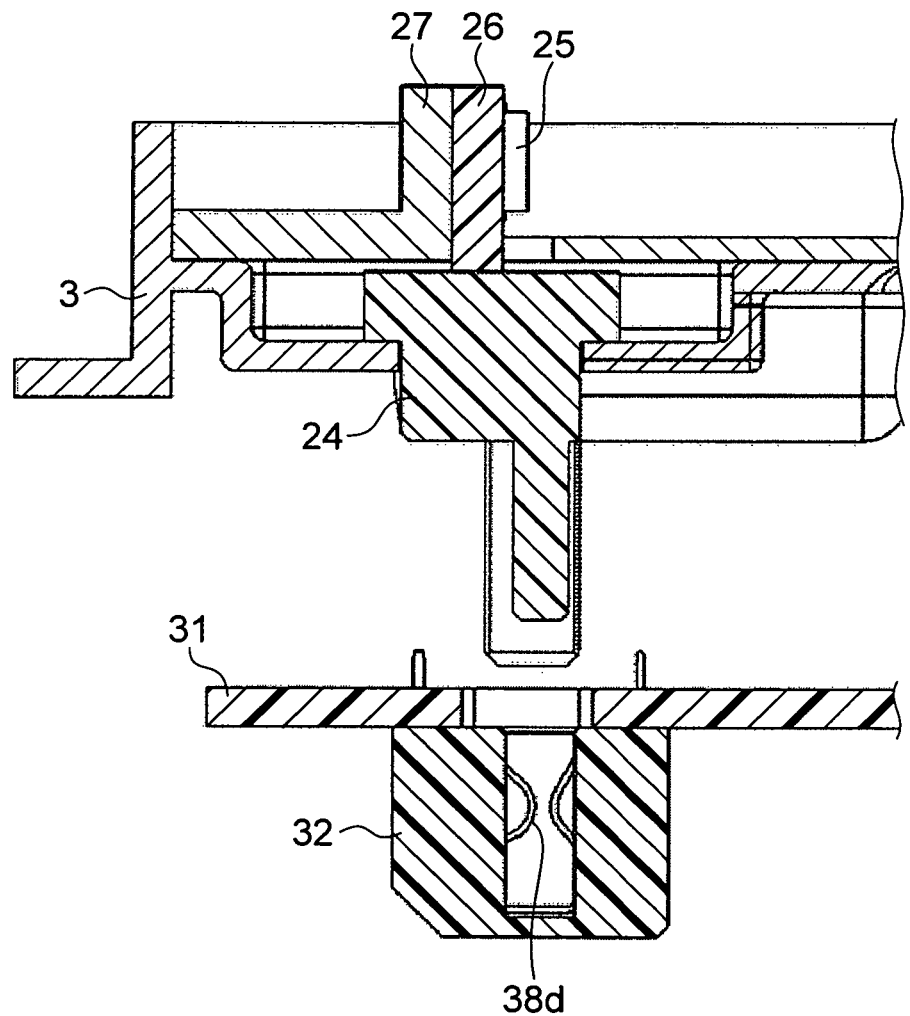
FIG. 16 is a cross-sectional view that the first connector and the second connector are to be connected to each other in the first embodiment.

As shown in FIG. 16, the first connector 24 is positioned with respect to the second connector 32. Then the first connector 24 is mated with or fitted to the second connector 32 as in a first form illustrated in FIG. 17 or in a second form illustrated in FIG. 18. A space t1 between the chassis 3 and the power supply substrate 31 in FIG. 17 is smaller than a space t2 between the chassis 3 and the power supply substrate 31 in FIG. 18. In either case, however, a desired electric connection can be established between the first connector 24 and the second connector 32. Specifically, since the connector contact parts 35d of the first connector 24 have a long effective contact length, the backlight assembly 1 can cope with positional variations of the chassis 3 and the power supply substrate 31 by varying contact points of the first connector 24 and the second connector 32.

Furthermore, the aforementioned structure needs no rubber plug or harness. Additionally, the aforementioned structure does not require a process of passing a harness through a hole of the chassis 3 and connect the harness to a front substrate and a rear substrate (the light-emitting element substrates and the power supply substrate) when the backlight assembly 1 is assembled. Therefore, a man-hour can be reduced. Accordingly, the manufacturing cost can be reduced. Moreover, since the above structure does not require a process of passing a harness through a hole of the chassis and connecting the harness to the front substrate and the rear substrate, respectively, the structure is suitable for a structure in which components are assembled by stacking. Therefore, the workability for assembly is improved. The manufacturing cost of the backlight assembly 1 and the backlight unit 200 can also be reduced.

Next, a backlight assembly according to a second embodiment of the present invention and a method of manufacturing the backlight assembly will be described below with reference to FIGS. 19 to 30. Portions similar in function to the components of FIGS. 1 to 18 may be denoted by the same reference numbers even if they are different in structure from the components of FIGS. 1 to 18. The explanation of those portions may be omitted from the following description.

In the backlight assembly according to the first embodiment described with reference to FIGS. 2 to 9, the second connector 32 is mounted on the power supply substrate 31. Nevertheless, the second connector 32 may electrically be connected to the power supply substrate 31 via a flexible harness.

Figure 19:
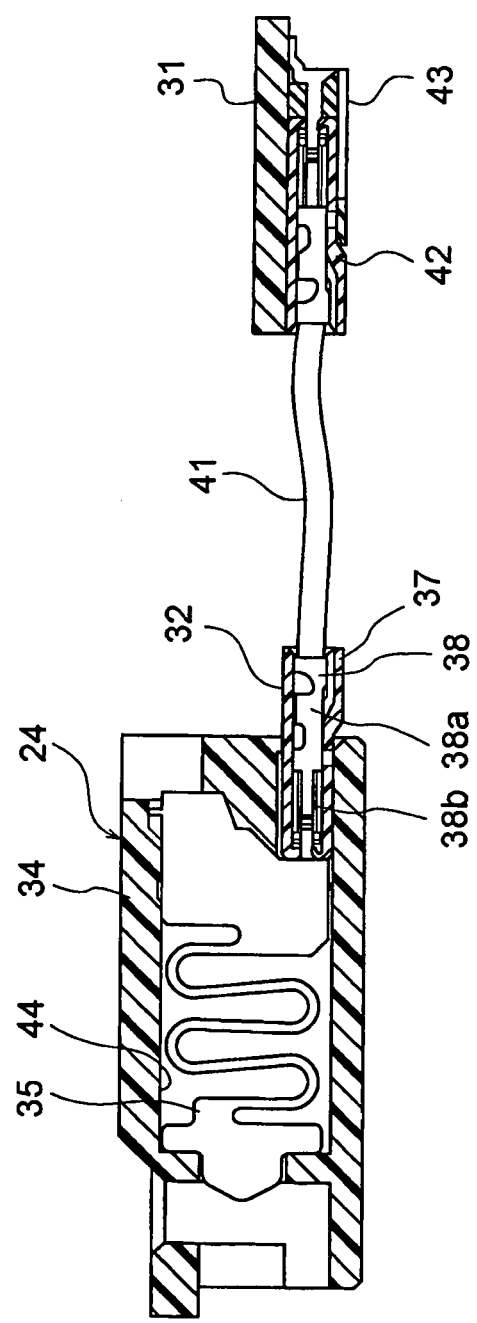
FIG. 19 is a cross-sectional view showing connection between a first connector and a power supply substrate in a backlight assembly according to a second embodiment of the present invention.

Furthermore, as shown in FIG. 19, a third connector 42 may be connected to an end opposite to the second connector 32 of the harness 41. The third connector 42 may be mated with and connected to a fourth connector 43 mounted on and connected to the power supply substrate 31. Thus, the second connector 32 may electrically be connected to the power supply substrate 31 via the harness 41, the third connector 42, and the fourth connector 43. In this case, a combination of the harness 41, the second connector 32, and the third connector 42 may be called a harness connector.

With the structure in which the second connector 32 is connected to the power supply substrate 31 via the flexible harness 41, the second connector 32 is mechanically separated from the power supply substrate 31. In this state, the position of the second connector 32 can be varied with respect to the power supply substrate 31 fixed to the chassis 3. Therefore, the positioning of the second connector 32 with respect to the first connector 24 fixed to the chassis 3 is facilitated.

Assembly of components on the chassis 3 in a variation of the backlight assembly 1 will be described with reference to FIGS. 20 to 25.

Figure 20:
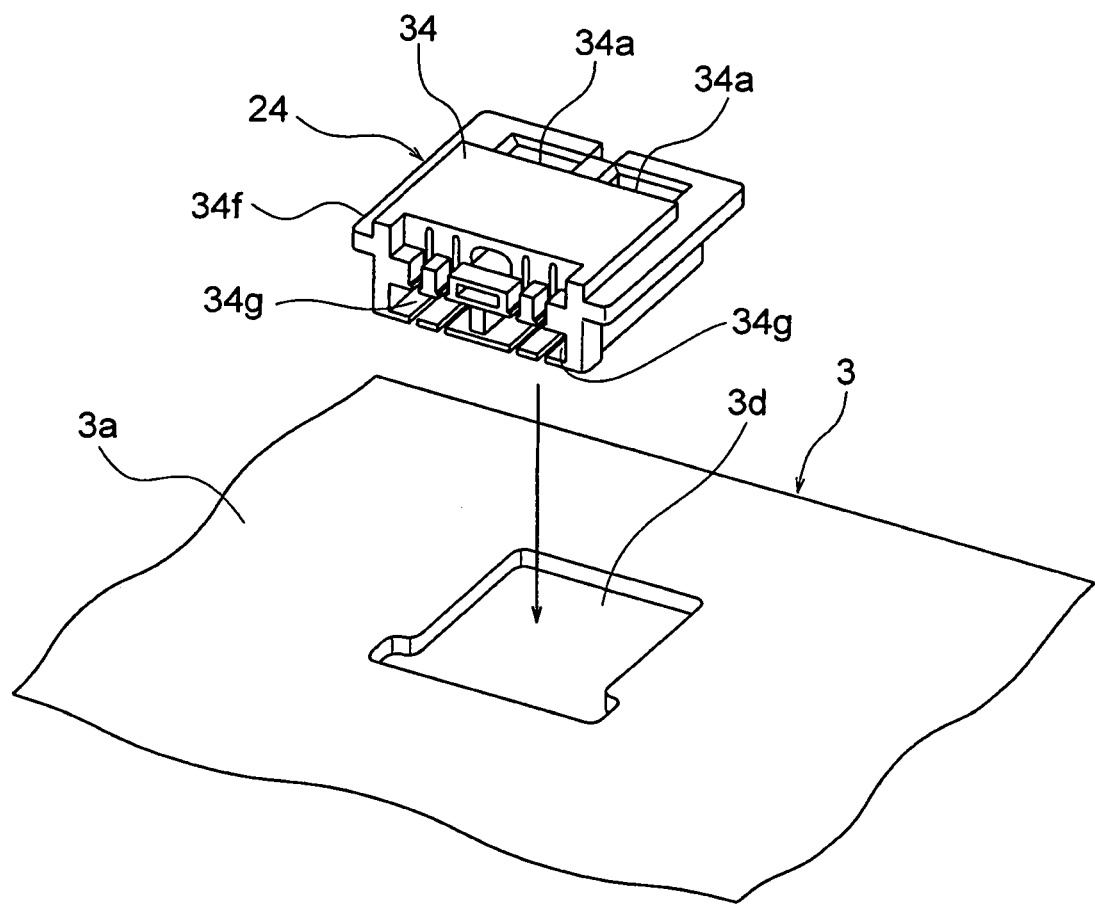
FIG. 20 is a perspective view explanatory of a process of attaching the first connector to a chassis of the backlight assembly in the second embodiment, as viewed from a front side of a chassis.

First, in FIG. 20, the first connector 24 is inserted into the chassis hole portion 3d of the chassis 3 from the front face of the chassis 3. At that time, a flange 34f formed at the periphery of the first housing 34 of the first connector 24 abuts the base plate portion 3a of the chassis 3, so that the first connector 24 engages with the chassis 3 as shown in FIG. 21.

Figure 21:
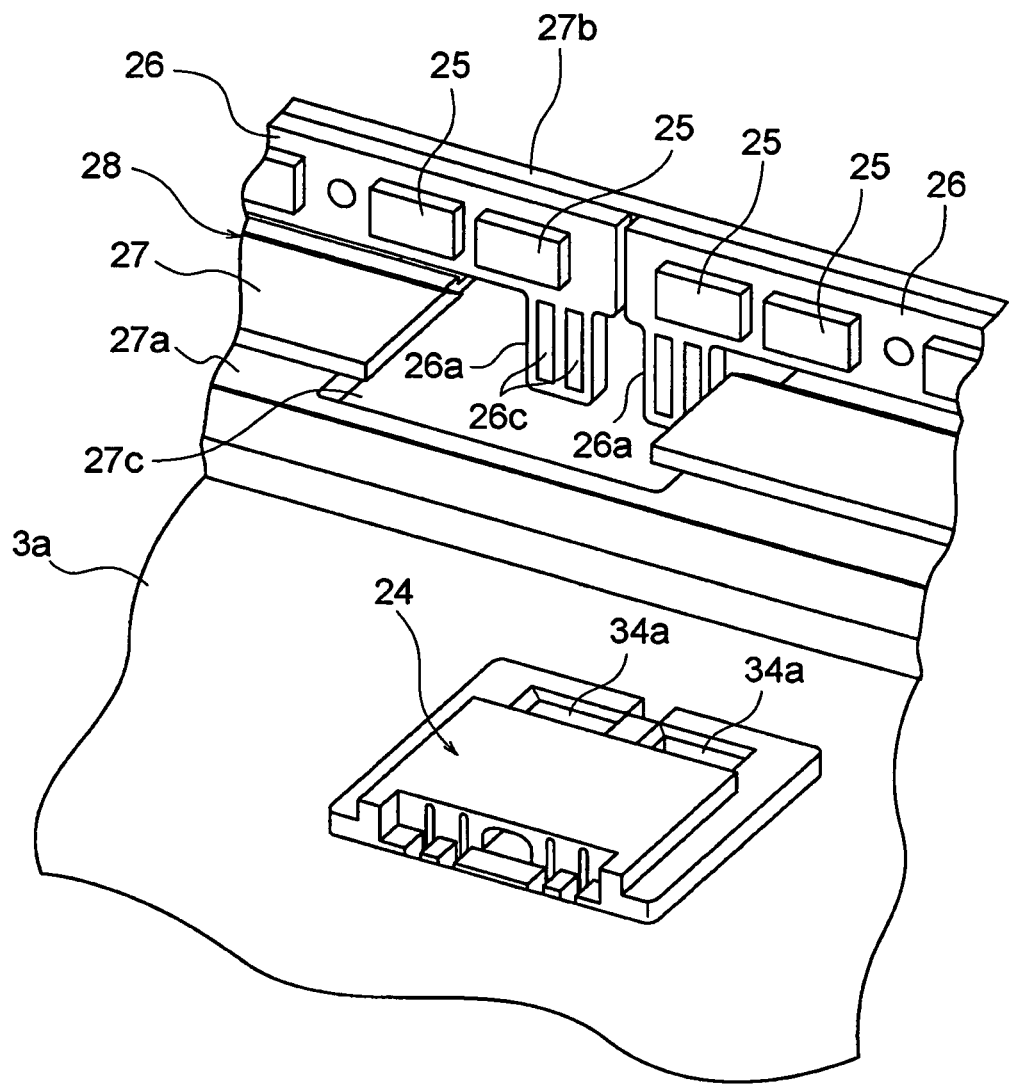
FIG. 21 is a perspective view explanatory of a process of connecting a light-emitting element substrate to the first connector attached to the chassis in the second embodiment, as viewed from the front side of a chassis.

In FIG. 21, the light-emitting part 28 in which the heat sink member 27 has been attached to the light-emitting element substrates 26 having a large number of light-emitting elements 25 is arranged on the front face of the chassis 3 on which the first connector 24 has been provided. At that time, the two substrate protrusions 26a are inserted into the two substrate insertion slots 34a of the first connector 24 as shown in FIG. 22.

Figure 22:
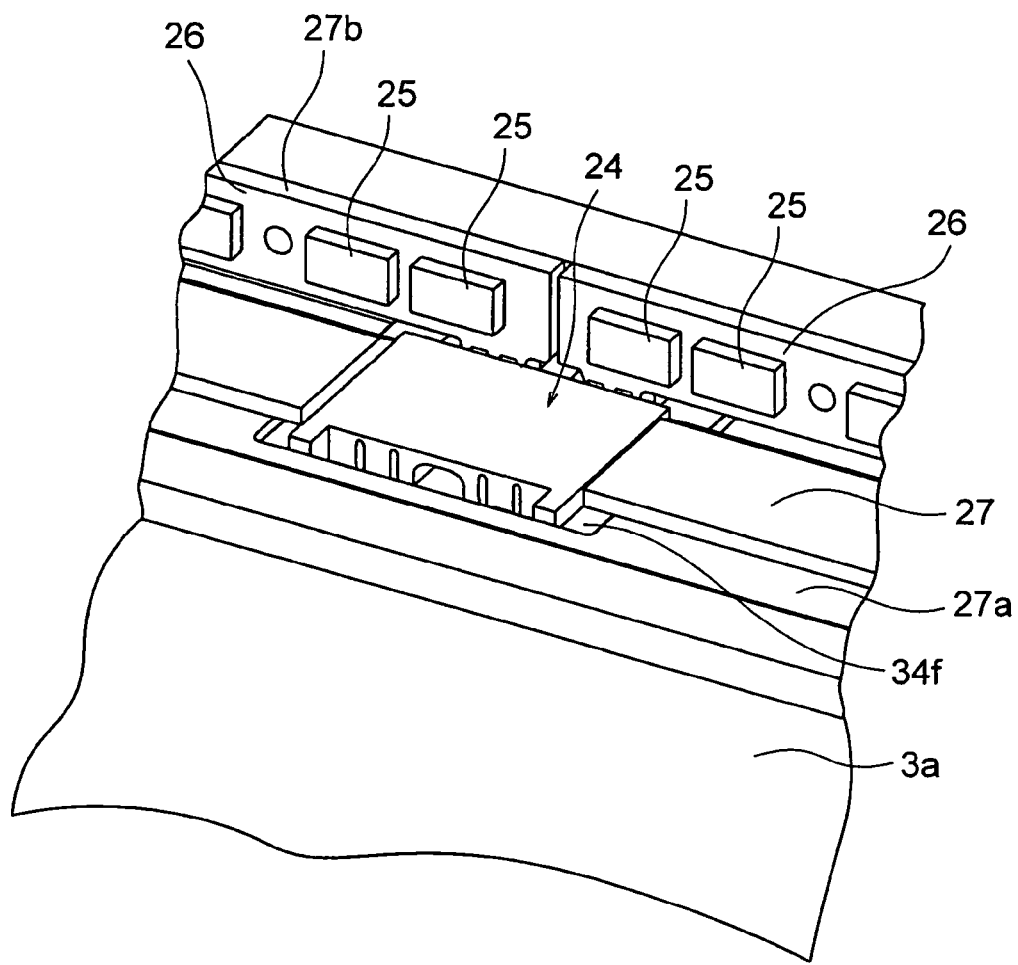
FIG. 22 is a perspective view similar to FIG. 21, showing that the light-emitting element substrate has been connected to the first connector attached to the chassis in the second embodiment.

In the state shown in FIG. 22, the heat sink member 27 is screwed on the chassis 3. Thus, a large number of light-emitting elements 25, to which a current can be supplied via the first connector 24, are arranged and fixed near one edge of the chassis 3 along the edge at the front side of the backlight assembly 1 shown in FIG. 1. The flange 34f is sandwiched between the base plate portion 3a and the heat sink member 27, so that the first connector 24 is fixed.

Figure 23:
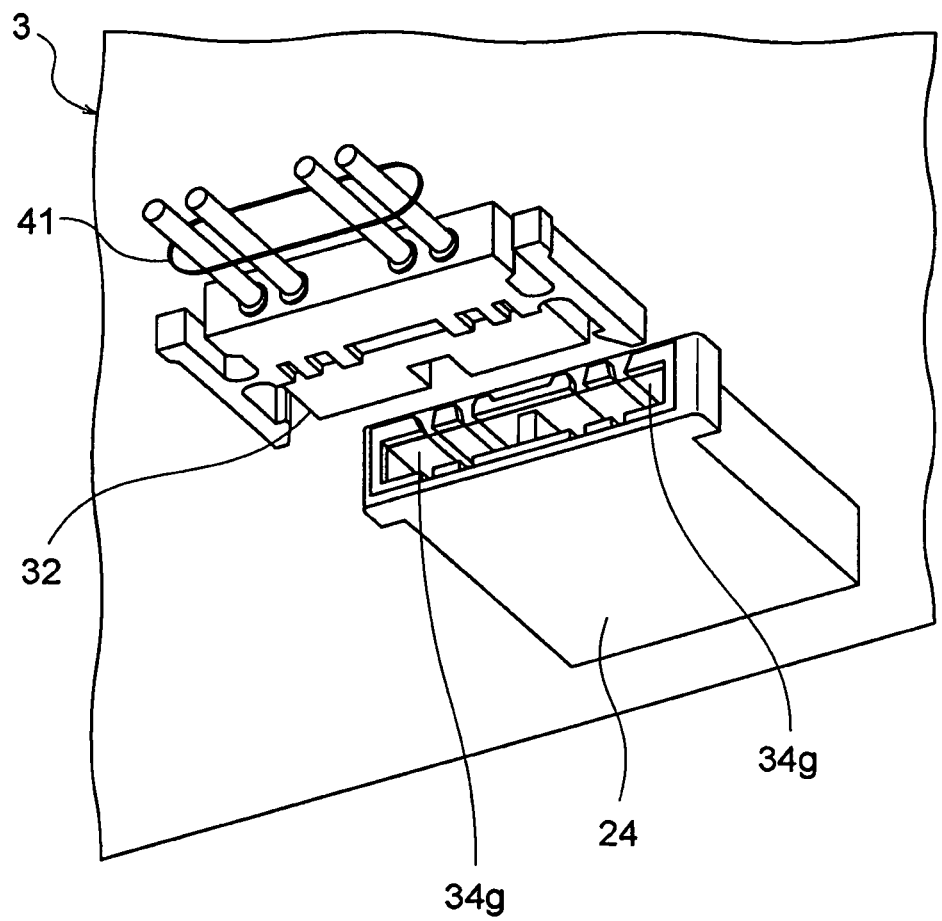
FIG. 23 is a perspective view showing the light-emitting element substrate shown in FIG. 22 as viewed from a rear side of the chassis.
Figure 24:
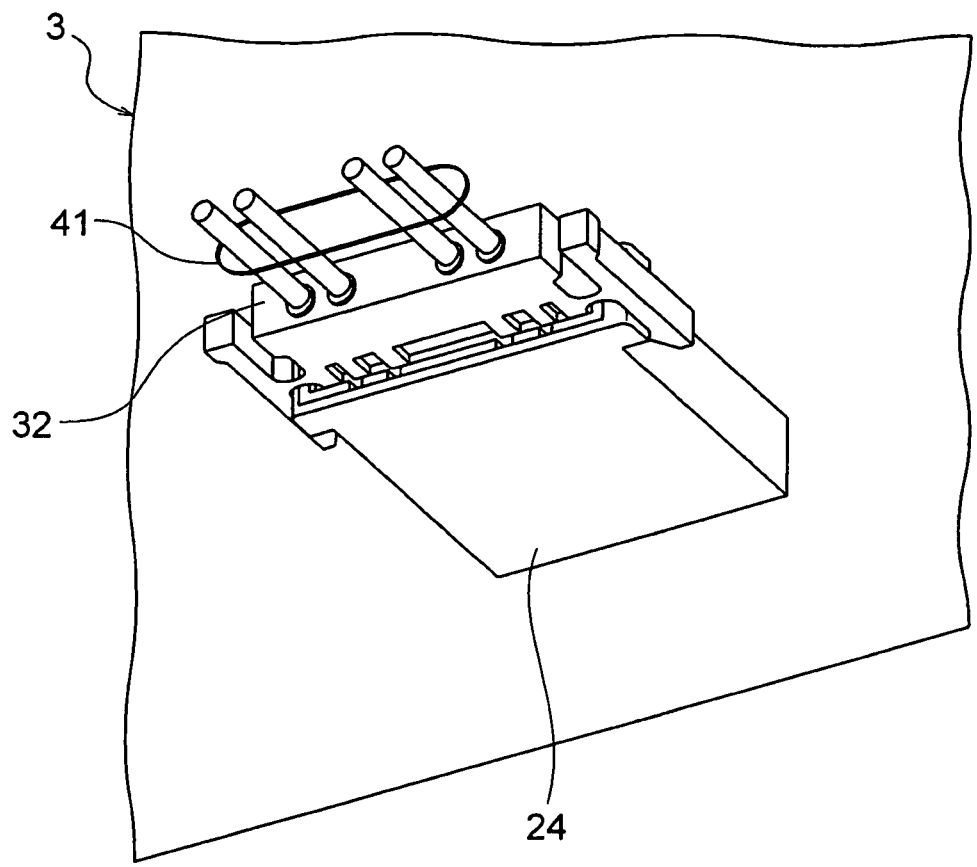
FIG. 24 is a perspective view similar to FIG. 23, showing that the second connector has been connected to the first connector.

Referring to FIG. 23, part of the first connector 24 projects from the rear face of the chassis 3. That part of the first connector 24 has two connector insertion slots 34g formed therein. Meanwhile, the second connector 32 is electrically connected to one end of the harness 41. The other end of the harness 41 is electrically connected to the power supply substrate 31, which is arranged in parallel on the rear face of the chassis 3 and fixed to the chassis 3 by screws. The second connector 32 is fitted into the connector insertion slots 34g of the first connector 24 as shown in FIG. 24. Thus, electric power can be supplied from the power supply substrate 31 to the light-emitting element substrates 26 via the harness 41, the second connector 32, and the first connector 24.

Figure 25:
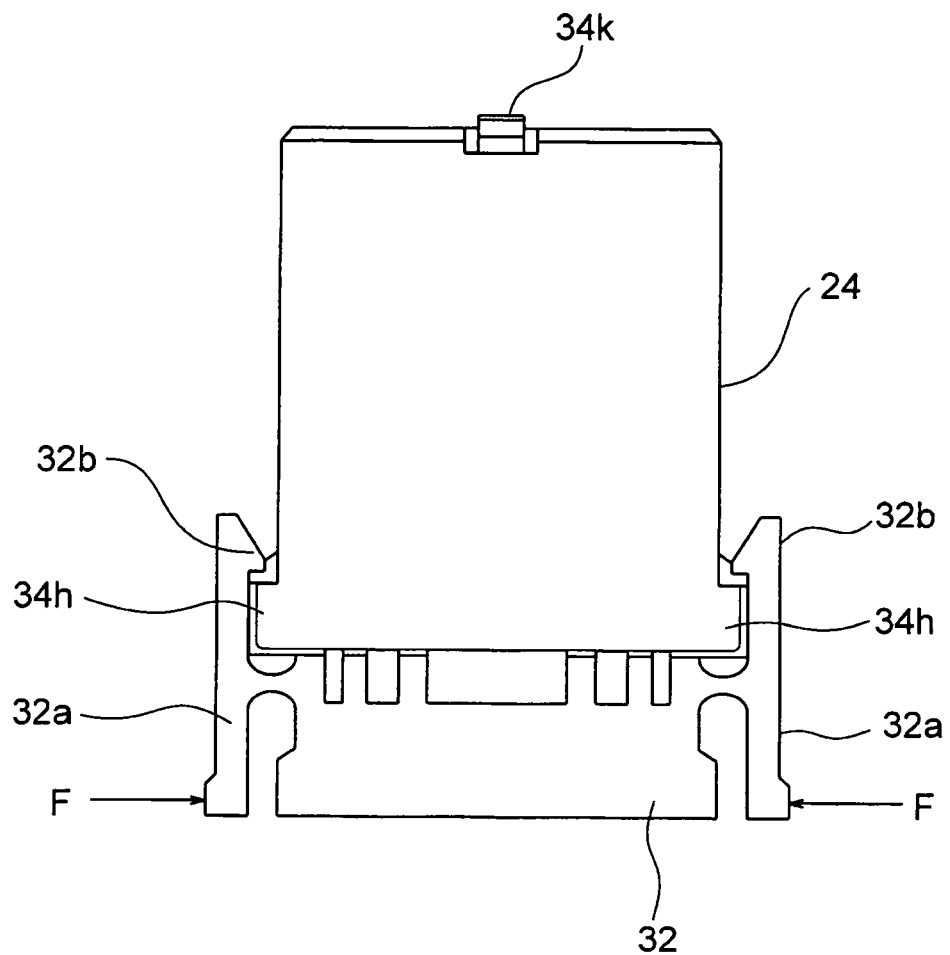
FIG. 25 is a plan view showing that the first connector and the second connector have been connected to each other in the second embodiment.

FIG. 25 illustrates the relationship between the first connector 24 and the second connector 32 shown in FIG. 24. In FIG. 25, the second connector 32 has movable levers 32a with locking hooks 32b formed on ends of the movable levers 32a. The locking hooks 32b engage with locking parts 34h of the first connector 24 so as to lock a mating state of the first connector 24 and the second connector 32. When external forces F are applied to the other ends of the levers 32a, the locking hooks 32b are disengaged from the locking parts 34h. Thus, the first connector 24 and the second connector 32 can be unlocked with ease.

Supplementary explanation of the first connector 24 in the backlight assembly according to the second embodiment will be provided with reference to FIGS. 26A to 30 as well as FIG. 19. Portions similar to those of the first connector shown in FIGS. 10A to 12 are denoted by the same reference numerals, and the explanation thereof is omitted herein.

Figure 27:
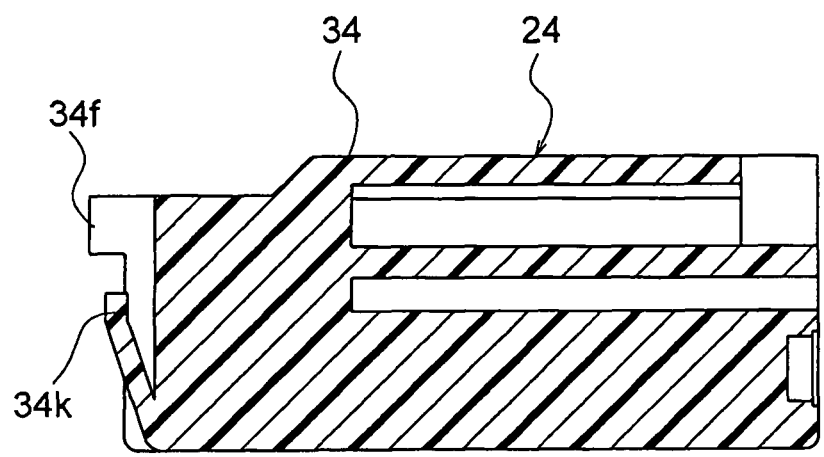
FIG. 27 is a cross-sectional view taken along line A-A of FIG. 26A.
Figure 28:
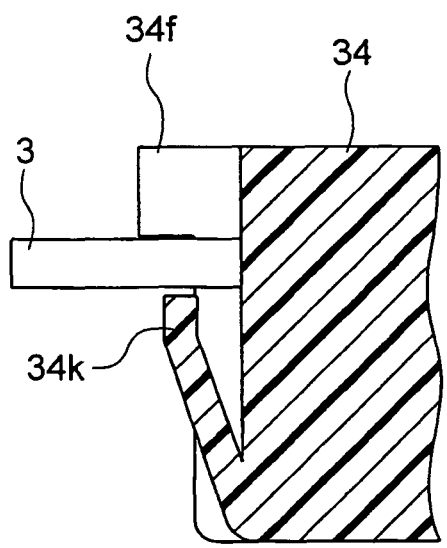
FIG. 28 is a cross-sectional view similar to FIG. 27, showing the relationship between the first connector and the chassis.

Referring to FIG. 27 as well as FIGS. 26A to 26E, the first housing 34 of the first connector 24 has an elastic part 34k formed on an end opposite to the locking parts 34h at a position corresponding to a discontinuous part 34j of the flange 34f. As shown in FIG. 28, the elastic part 34k binds or fixes the first connector 24 with respect to the chassis 3 in cooperation with the flange 34f. In other words, a combination of the flange 34f and the elastic part 34k serves as a chassis engagement portion.

Figure 29:
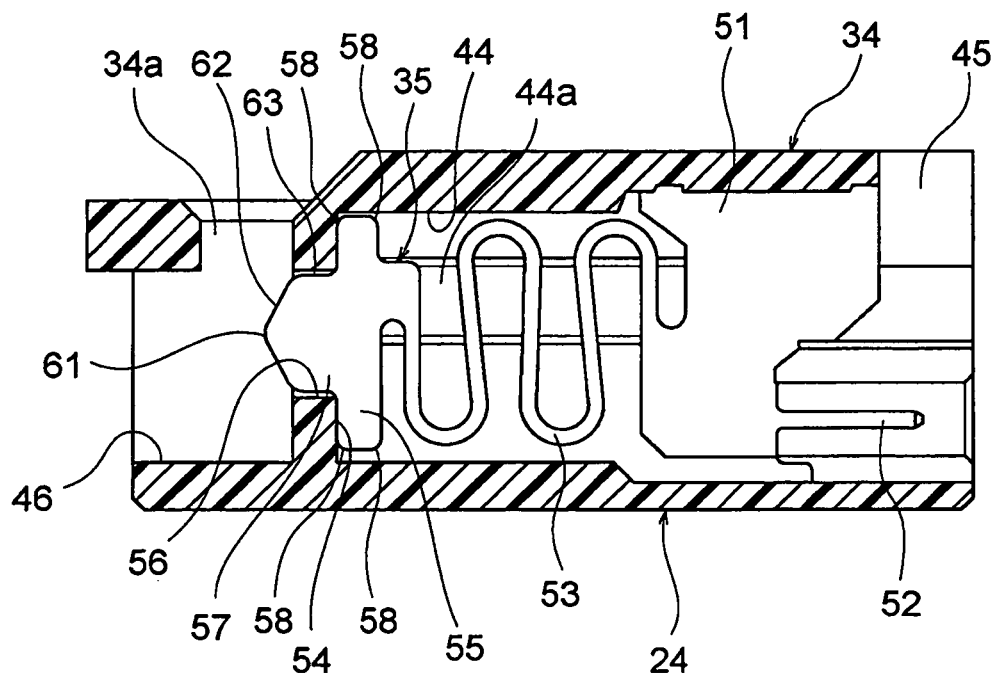
FIG. 29 is a cross-sectional view taken along line B-B of FIG. 26A.

Referring to FIG. 29 as well as FIGS. 26A to 26E, there can clearly be seen the relationship between the first housing 34 and the first contacts 35 incorporated in the first housing 34.

The first housing 34 has four contact receiver holes 44 in which the first contacts 35, which is formed of a thin plate of a conductor, are press-fitted. Each of the contact receiver holes 44 is in the form of a narrow slit similar to the first contacts 35 and partially includes a broadened portion 44a. The broadened portions 44a facilitate formation of the contact receiver holes 44 at the time of plastic molding of the first housing 34.

Furthermore, the first housing 34 has a cutout portion 45 formed on the right end thereof in FIG. 29. The cutout portion 45 allows the first contacts 35 to be pushed. The first housing 34 has a hole 46 formed on the left end thereof in FIG. 29. The hole 46 permits inspection or confirmation of the first contacts 35.

Each of the first contacts 35 includes a fixed part (engagement portion) 51 press-fitted and fixed to the first housing 34, a pin part (contact portion) 52 projecting toward one side of the first contact 35 from the fixed part 51, a spring part 53 meandering and extending toward the other side of the first contact 35 from the fixed part 51, an abutment part 55 formed integrally with the spring part 53 at an extended end of the spring part 53, and a movable part 57 extending from the abutment part 55. A preload is applied to the abutment part 55 by the spring part 53 so that the abutment part 55 abuts an abutment surface 54 of the first housing 34. The movable part 57 is inserted in a guide hole 56 of the first housing 34. The abutment part 55 has rounded edges 58 having an arc cross-section. Furthermore, the movable part 57 includes a contact point 61, a slope portion 62, and a straight portion 63. The aforementioned second connector 32 is electrically connected to the pin part 52. A combination of the spring part 53, the abutment part 55, the movable part 57, the rounded edges 58, the contact point 61, the slope portion 62, and the straight portion 63 serves as a spring portion.

With regard to the second contact 38 shown in FIG. 19, portions similar in function to those of the second contact of FIG. 14 are denoted by the same reference numbers. The explanation of those portions is omitted herein.

Figure 30:
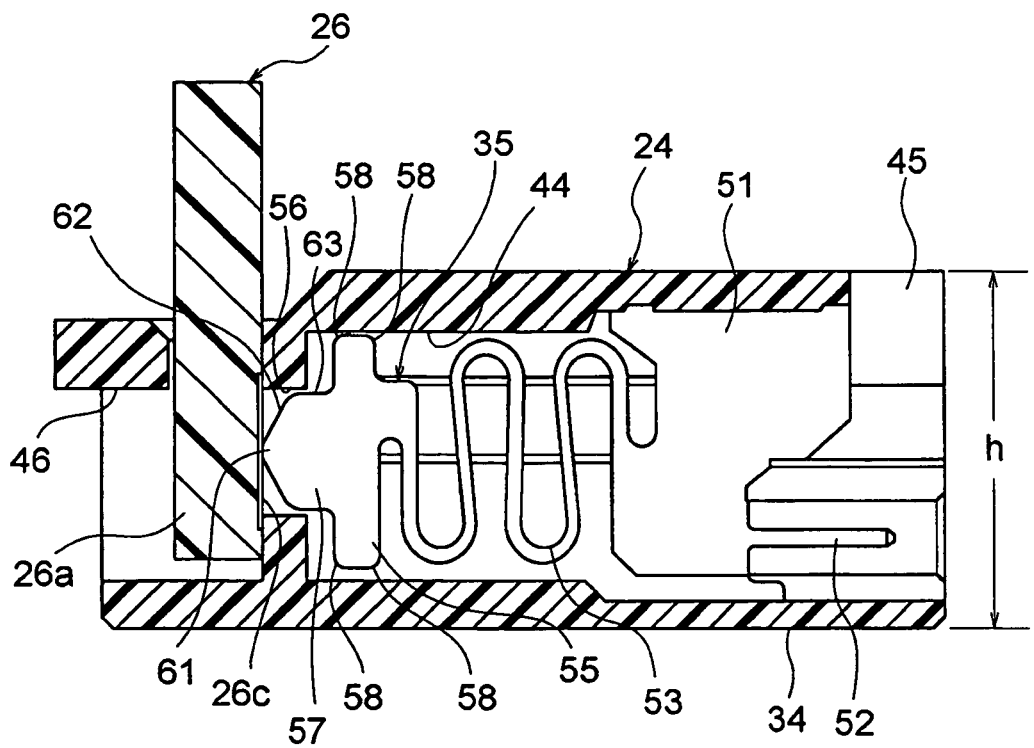
FIG. 30 is a cross-sectional view explanatory of the relationship between the first connector and the light-emitting element substrate in the second embodiment.
Figure 31:
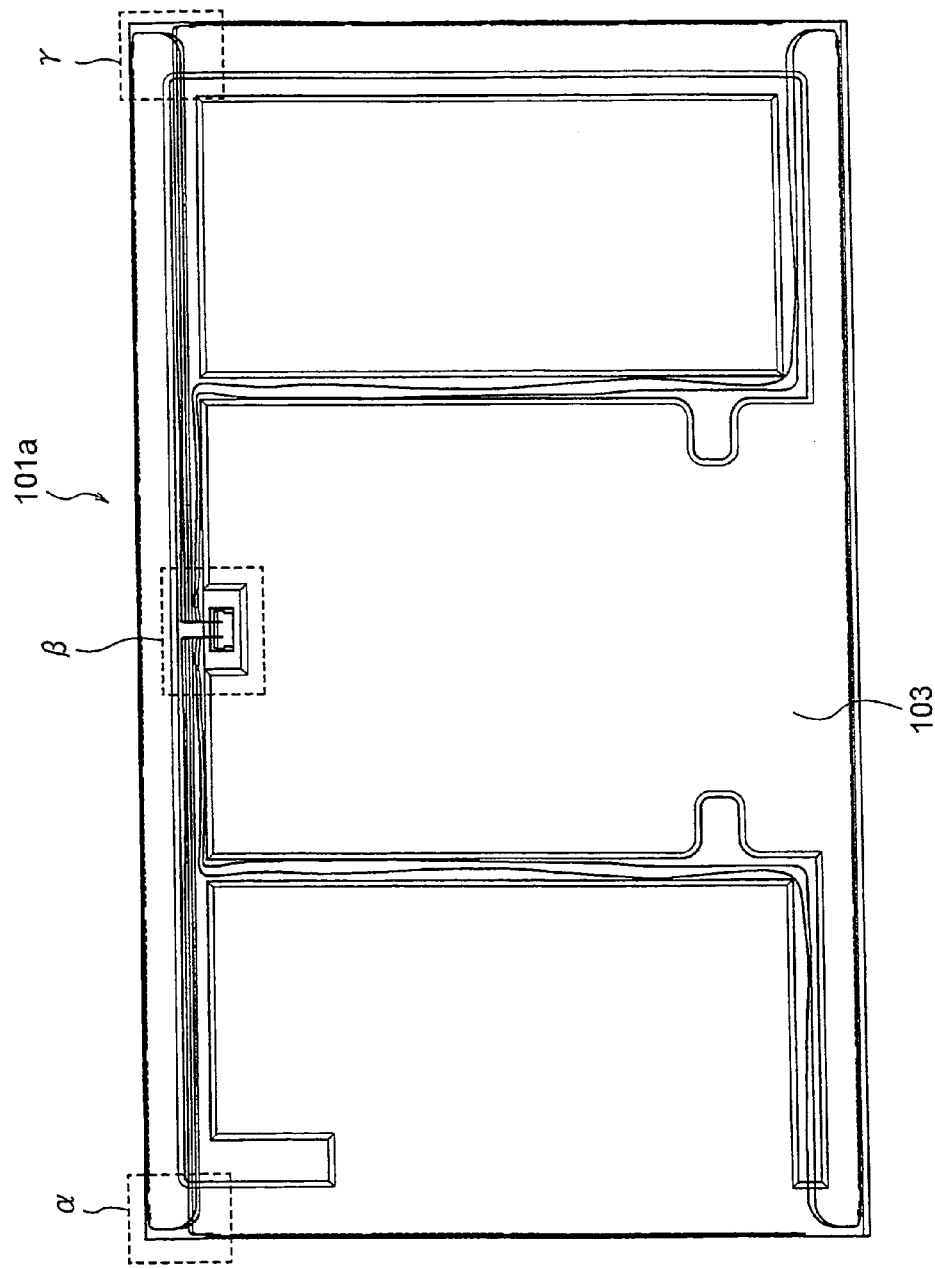
FIG. 31 is a plan view showing an example of a conventional backlight assembly.
Figure 32A:
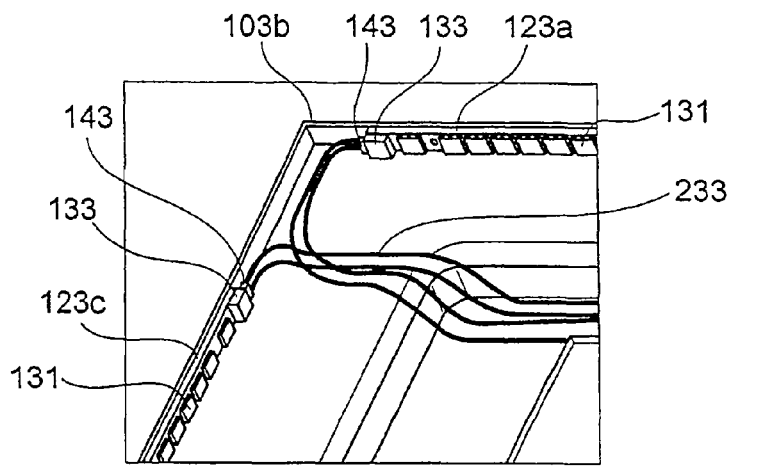
FIG. 32A is an enlarged perspective view showing an area α enclosed by a broken line in FIG. 31.
Figure 32B:
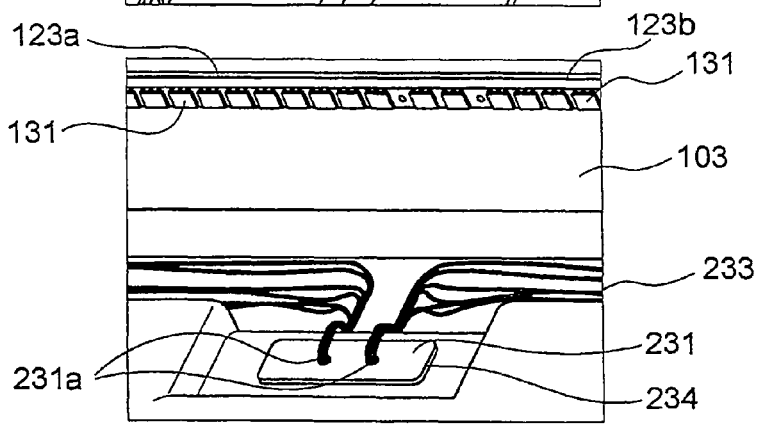
FIG. 32B is an enlarged perspective view showing an area β enclosed by a broken line in FIG. 31.
Figure 32C:
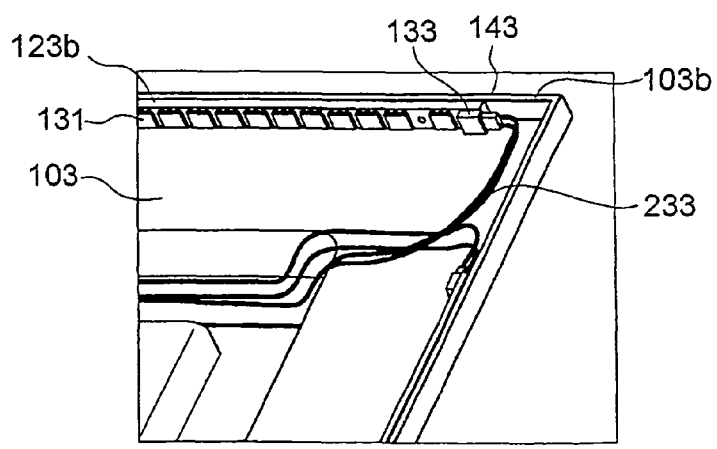
FIG. 32C is an enlarged perspective view showing an area γ enclosed by a broken line in FIG. 31.
Figure 33:
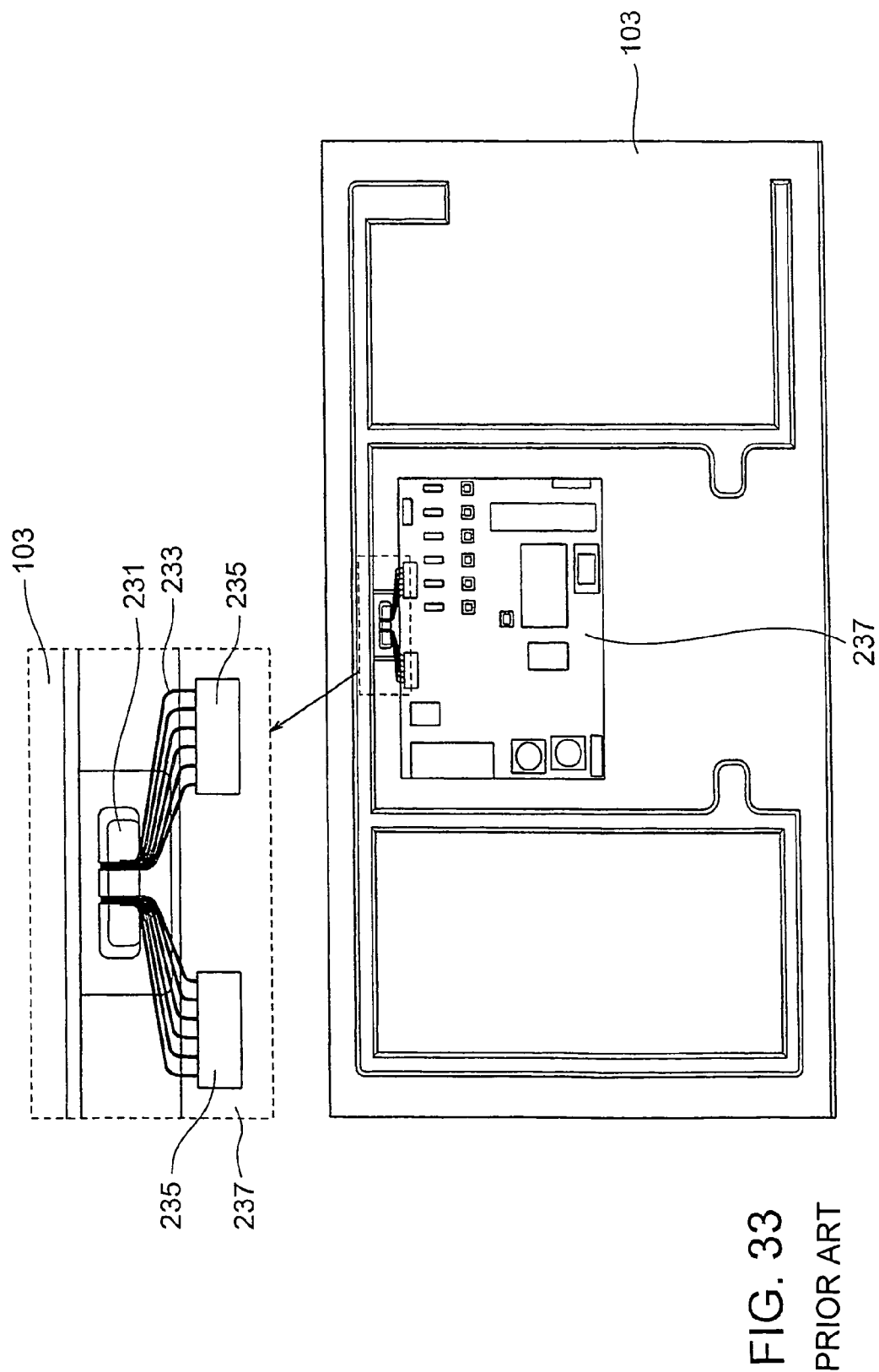
FIG. 33 is a bottom view of FIG. 31.

As shown in FIG. 30, when the substrate protrusions 26a of the light-emitting element substrates 26 are inserted in the substrate insertion slots 34a of the first housing 34, the slope portion 62 is pushed by the substrate protrusion 26a so as to move the movable part 57 back against the spring part 53. Then the contact point 61 is brought into contact with the contact portion 26c of the substrate protrusion 26a.

The first contact 35 is designed such that at least part of the straight portion 63 is inserted in the guide hole 56 even if the movable part 57 is moved back. Thus, buckling deformation of the spring part 53 can be inhibited while inclination of the slope portion 62 is prevented.

Furthermore, since the abutment part 55 has rounded edges 58, it is possible to prevent an operational defect that would caused by the edges of the abutment part 55 engaging with an inner wall of the contact receiver hole 44 if the straight portion 63 were slightly inclined.

Moreover, the height h of the first connector 24 can be made relatively small. Therefore, the entire dimension of the backlight assembly and the display apparatus using the backlight assembly can readily be reduced.

Various modifications including the following examples can be applied to the first and second embodiments.

The light-emitting element substrates 26 are illustrated as being provided on only one side of the chassis 3. However, the present invention is not limited to the case in which the light-emitting element substrates 26 are provided on only one side of the chassis 3. The light-emitting element substrates 26 may be provided on a plurality of sides of the chassis 3.

The chassis abutment surface 34c of the first housing 34 is positioned with respect to the chassis 3 by the chassis engagement hooks 34d provided on the first housing 34. However, the chassis abutment surface 34c may be positioned by the light-emitting element substrates 26 fixed to the chassis 3. In such a case, the first housing 34 can be bound without the chassis engagement hooks 34d of the first housing 34. In either case, the chassis abutment surface 34c serves as a chassis engagement portion that engages with the chassis 3.

The first housing 34 may not bound or fixed to the chassis 3 and may be bound or fixed to another member, such as a radiator plate (heat sink).

This invention is not limited to the above-mentioned embodiment and part or the whole thereof can also be described as the following supplementary notes but is not limited thereto.

(Supplementary Note 1)
A backlight assembly 1 comprising:
a chassis 3 which has a front face and a rear face;
a light-emitting element substrate 26 which is arranged on the front face of the chassis and mounts a light-emitting element 25;
a power supply substrate 31 which is arranged on the rear face of the chassis for supplying electric power to the light-emitting element substrate;
a first connector 24 which is held on the chassis and connected to the light-emitting element substrate; and
a second connector 32 which is connected to the power supply substrate and to the first connector,
whereby the electric power is supplied from the power supply substrate to the light-emitting element substrate via the first connector and the second connector.

(Supplementary Note 2)
The backlight assembly according to supplementary note 1, wherein the second connector is mounted on and connected to the power supply substrate.

(Supplementary Note 3)
The backlight assembly according to supplementary note 1, further comprising a harness 41 which is connected between the second connector and the power supply substrate, wherein the second connector is mechanically separated from the power supply substrate.

(Supplementary Note 4)
The backlight assembly according to any one of supplementary notes 1 to 3, wherein the first connector includes:
a first housing 34 which has nonconductivity and penetrates the chassis; and
a first contact 35 which has conductivity and is held on the first housing.

(Supplementary Note 5)
The backlight assembly according to supplementary note 4, wherein the first housing includes:
an insertion slot 34a in which the light-emitting element substrate is inserted; and
a chassis engagement portion 34d which engages with the chassis.

(Supplementary Note 6)
The backlight assembly according to supplementary note 4, wherein the first contact includes:
an engagement portion 35a which engages with the first housing;
a spring portion 35c which is provided on one side of the engagement portion and brought into contact with the light-emitting element substrate; and
a contact portion 35d which is provided on an opposite side of the engagement portion and brought into contact with the second connector.

(Supplementary Note 7)
The backlight assembly according to any one of supplementary notes 1 to 6, wherein the second connector includes:
a second housing 37 which has noncoductivity;
a second contact 38 which has conductivity and is held on the second housing; and
a hold-down part 39 which is fixed on the second housing, wherein the hold-down part is soldered and fixed to the power supply substrate.

(Supplementary Note 8)
The backlight assembly according to supplementary note 7, wherein the second contact includes:
an engagement portion 38a which engages with the second housing, and
a spring portion 38b for contacting the first contact.

(Supplementary Note 9)
A backlight unit 200 comprising:
the backlight assembly according to any one of supplementary notes 1 to 8; and
an optical system which is arranged in front of the chassis.

(Supplementary Note 10)
The backlight unit according to supplementary note 9, wherein the optical system includes a reflective sheet 5, a light guide plate 7, a diffusive sheet 9, a prism sheet 11, and a condensing sheet 13 stacked in front of the chassis in order named.

(Supplementary Note 11)
A liquid crystal display apparatus 100 comprising:
the backlight unit according to supplementary note 9 or 10; and
a liquid crystal display portion 300,
wherein the optical system is arranged between the backlight assembly and the liquid crystal display portion.

(Supplementary Note 12)
The liquid crystal display apparatus according to supplementary note 11, further comprising a frame 15 which mounts the backlight unit and the liquid crystal display portion.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:
1. A backlight assembly comprising:
a chassis which has a front face and a rear face;
a light-emitting element substrate which is arranged on the front face of the chassis and mounts a light-emitting element;
a power supply substrate which is arranged on the rear face of the chassis for supplying electric power to the light-emitting element substrate;
a first connector which is held on the chassis and connected to the light-emitting element substrate; and
a second connector which is connected to the power supply substrate and to the first connector,
whereby the electric power is supplied from the power supply substrate to the light-emitting element substrate via the first connector and the second connector, and
wherein the first connector includes:
a first housing which has nonconductivity and penetrates the chassis; and
a first contact which has conductivity and is held on the first housing.

2. The backlight assembly according to claim 1, wherein the second connector is mounted on and electrically connected to the power supply substrate.

3. The backlight assembly according to claim 1, further comprising a harness which is electrically connected between the second connector and the power supply substrate, wherein the second connector is mechanically separated from the power supply substrate.

4. The backlight assembly according to claim 1, wherein the first housing includes:
   an insertion slot in which the light-emitting element substrate is inserted; and
   a chassis engagement portion which engages with the chassis.

5. The backlight assembly according to claim 1, wherein the first contact includes:
   an engagement portion which engages with the first housing;
   a spring portion which is provided on one side of the engagement portion and brought into contact with the light-emitting element substrate; and
   a contact portion which is provided on an opposite side of the engagement portion and brought into contact with the second connector.

6. A backlight unit comprising:
   the backlight assembly according to claim 1; and
   an optical system which is arranged in front of the chassis.

7. The backlight unit according to claim 6, wherein the optical system includes a reflective sheet, a light guide plate, a diffusive sheet, a prism sheet, and a condensing sheet stacked in front of the chassis in order named.

8. A liquid crystal display apparatus comprising:
   the backlight unit according to claim 6; and
   a liquid crystal display portion, wherein the optical system is arranged between the backlight assembly and the liquid crystal display portion.

9. The liquid crystal display apparatus according to claim 8, further comprising a frame which mounts the backlight unit and the liquid crystal display portion.

10. A backlight assembly comprising:
    a chassis which has a front face and a rear face;
    a light-emitting element substrate which is arranged on the front face of the chassis and mounts a light-emitting element;
    a power supply substrate which is arranged on the rear face of the chassis for supplying electric power to the light-emitting element substrate;
    a first connector which is held on the chassis and connected to the light-emitting element substrate; and
    a second connector which is connected to the power supply substrate and to the first connector,
    whereby the electric power is supplied from the power supply substrate to the light-emitting element substrate via the first connector and the second connector, and
    wherein the second connector includes:
    a second housing which has noncoductivity;
    a second contact which has conductivity and is held on the second housing; and
    a hold-down part which is fixed on the second housing,
    wherein the hold-down part is soldered and fixed to the power supply substrate.

11. The backlight assembly according to claim 10, wherein the second contact includes:
    an engagement portion which engages with the second housing, and
    a spring portion for contacting the first contact.

* * * * *